United States Patent Office 3,753,993
Patented Aug. 21, 1973

3,753,993
1,4-DIHYDRO-4-OXO-7-PYRIDYL-3-QUINOLINE-
CARBOXYLIC ACID DERIVATIVES
George Y. Lesher, and Philip M. Carabateas, Schodack,
N.Y., assignors to Sterling Drug Inc., New York, N.Y.
No Drawing. Filed May 17, 1971, Ser. No. 144,307
Int. Cl. C07d 33/48
U.S. Cl. 260—286 R                           25 Claims

ABSTRACT OF THE DISCLOSURE 1,4-dihydro-1-(lower-alkyl)-4-oxo - 7 - pyridyl-3-quinolinecarboxylic acids and lower-alkyl esters having antibacterial activity, are prepared by reacting the corresponding 1,4-dihydro-4-oxo-7-pyridyl-3-quinolinecarboxylic acid or lower-alkyl ester with an alkylating agent, e.g., lower-alkyl halide, sulfate or sulfonate, and by other methods.

---

This invention relates to compositions of matter classified in the art of chemistry as 1-alkyl-1,4-dihydro-4-oxo-3-quinolinecarboxylic acids and esters, and to their preparation.

The invention in its composition aspect resides in the class of compounds which we designate 1-$R_1$-1,4-dihydro-3-(COOR)-4-oxo-7-PY-quinoline where $R_1$ is lower-alkyl, lower-hydroxyalkyl or lower-haloalkyl, R is hydrogen or lower-alkyl, and PY is Q-1-(O)$_n$-4(3 or 2)-pyridyl or Q-1-Q'-4(3 or 2)-piperidyl where $n$ is zero or one, Q is from one to four substituents selected from those given for Formula I below (i.e., $R_2$, $R_3$, $R_5$ and $R_6$) and Q' is hydrogen or lower-alkyl. The compounds of this composition aspect of the invention have antibacterial properties, as determined by standard antibacterial evaluation procedures, and thus are useful as antibacterial agents.

Without limiting the generality of the foregoing, illustrative and preferred embodiments of our invention are the 1,4-dihydro-1-(lower - alkyl)-4-oxo-7-(4 - pyridyl)-3-quinolinecarboxylic acids and esters of Formula I

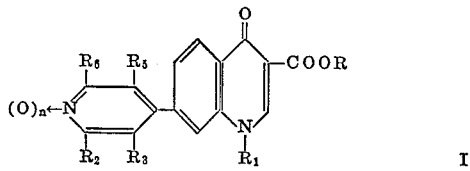

where R is hydrogen or lower-alkyl, $R_1$ is lower-alkyl, lower-hydroxyalkyl or lower-haloalkyl, $n$ is zero or 1, and, $R_2$, $R_3$, $R_5$ and $R_6$ are each selected from hydrogen, lower-alkyl, lower-alkoxy, halo, hydroxy, lower-alkanoyloxy, hydroxymethyl, aminomethyl, lower-alkanoylaminomethyl, amino, formyl, cyano, carbamyl, carboxy and lower-carbalkoxy.

Each of the terms "lower-alkyl," "lower-alkoxy" and "lower-alkanoyl," as used above and throughout the specification and claims, e.g., as used in the definition of $R_2$, $R_3$, $R_5$ and $R_6$ of Formula I or, in the case of "lower-alkyl," in the definition of R or $R_1$, means alkyl, alkoxy or alkanoyl radicals having from one to six carbon atoms which can be arranged as straight or branched chains, among which are, for purposes of illustration but without limiting the generality of the foregoing: methyl, ethyl, n-propyl, 2-butyl, isobutyl and n-hexyl for lower-alkyl; methoxy, ethoxy, n-propoxy, isopropoxy, isobutoxy, n-amoxy and n-hexoxy for lower-alkoxy; and, formyl, acetyl, propionyl (n-propanoyl), isobutyryl (2-methyl-n-propanoyl) and caproyl (n-hexanoyl) for lower-alkanoyl.

The term "lower-carbalkoxy," as used above and throughout the specification and claims, e.g., as used in the definition of $R_2$, $R_3$, $R_5$ or $R_6$ of Formula I, means carbalkoxy radicals where the alkoxy position can be straight- or branched-chained and has from one to six carbon atoms, as illustrated by carbomethoxy, carbethoxy, carbisopropoxy, carbo-n-propoxy, carbo-n-butoxy and carbo-n-hexoxy.

Each of the terms "lower-hydroxyalkyl" and "lower-haloalkyl," as used above and throughout the specification and claims, e.g., as used in the definition of $R_1$ of Formula I, means hydroxyalkyl or haloalkyl radicals having from two to six carbon atoms which can be arranged as straight or branched chains and at least two carbon atoms of which separate hydroxy or halo and the ring-nitrogen atom of the quinoline ring, among which radicals are, for purposes of illustration but without limiting the generality of the foregoing: 2-hydroxyethyl, 3-hydroxypropyl, 2-hydroxypropyl, 4-hydroxybutyl, 3-hydroxybutyl, 5-hydroxyamyl and 6-hydroxyhexyl for lower-hydroxyalkyl; and, 2-chloroethyl, 2-bromoethyl, 3-iodopropyl, 2-chloropropyl, 4-fluorobutyl, 5-iodoamyl and 6-chlorohexyl for lower-haloalkyl.

The term "halo," as used above and throughout the specification and claims, e.g., as used in the definition of Q, $R_2$, $R_3$, $R_5$ or $R_6$ of Formula I or in the definition of $R_1$ as lower-haloalkyl, means chloro, bromo, iodo or fluoro.

The process aspect of the invention for producing 1-$R_1$-1,4-dihydro-3-(COOR)-4-oxo-7-PY-quinoline, where $R_1$ is lower-alkyl, lower-hydroxyalkyl or lower-haloalkyl, R is hydrogen or lower-alkyl, PY is Q-1-(O)$_n$-4(3 or 2)-pyridyl where $n$ is 0 or 1 and Q is from one to four substituents selected from those given for Formula I, i.e., designated as $R_2$, $R_3$, $R_5$ and $R_6$, comprises reacting the corresponding 1,4-dihydro-3-(COOR)-4-oxo-7-PY-quinoline with a lower-alkylating agent to provide the 1-substituent, $R_1$.

The above process aspect of the invention is further illustrated by the preparation of the preferred composition illustrated by Formula I above which comprises reacting the corresponding 1,4-dihydro-3-(COOR)-4-oxo-7-(4-pyridyl)quinoline, illustrated by Formula II

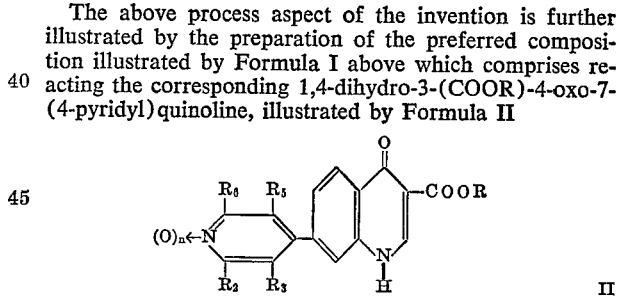

where R, $R_2$, $R_3$, $R_5$, $R_6$ and $n$ have the meanings given above for Formula I, with a lower-alkylating agent, preferably a lower-alkyl ester of a strong acid, that is, an acid which is practically completely dissociated in aqueous solution.

The preparation of the compounds of the invention where $R_1$ is lower-hydroxyalkyl or lower-haloalkyl is carried out either directly by using an alkylating agent substituted by hydroxy or halo, or stepwise, illustrated as follows. A convenient stepwise preparation of the 1-(hydroxyalkyl) compounds comprises reacting the 1,4-dihydro-3-(COOR)-4-oxo-7-PY-quinoline with a vinyloxyalkylating agent, e.g., vinyloxyalkyl halide, to prepare the corresponding 1-(vinyloxyalkyl) compound which is then treated with an agent capable of cleaving vinyl ethers, for example, an aqueous acidic agent, e.g., aqueous acetic acid, to form the corresponding 1-(hydroxyalkyl) compound. Similarly, the 1-(haloalkyl) compound can be prepared by halogenating, for example, using an acyl halide, e.g., thionyl chloride, the corresponding 1-(hydroxyalkyl) compound.

The intermediate compounds, as illustrated by Formula II, exist in tautomeric forms, that is, as the 1,4-dihydro- 3-(COOR)-4-oxo-7-PY-quinolines of Formula III and/or 3-(COOR)-4-hydroxy-7-PY-quinolines of Formula IIIA, illustrated as follows:

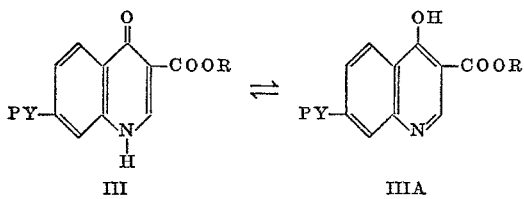

where PY is 1-(O)$_n$-2-R$_2$-3-R$_3$-5-R$_5$-6-R$_6$-4-pyridyl as shown above in Formula II where R, R$_2$, R$_3$, R$_5$, R$_6$ and $n$ have the meanings given for Formula I. Measurements of the infrared spectra, in potassium bromide admixture, or in chloroform solution or mineral oil suspension, indicate existence predominantly as structure III and we have preferred to use the names based on structure III, although it is understood that either or both structures are comprehended.

Similarly, the 7-[2(or 6)-hydroxy-4(3 or 2)-pyridyl] compounds of the invention are tautomeric with corresponding 7-[1,2(or 1,6)-dihydro-2(or 6)-oxo-4(3 or 2)-pyridyl] compounds; however, as a choice of convenience, these compounds are named herein as 2-hydroxypyridyl rather than 1,2-dihydro-2-oxopyridyl compounds, even though the latter is presumed to be the predominantly existing structure. Thus, as illustrated below, the 2-hydroxy-4-pyridyl (7-substituent) structure IVA is used preferably in naming these compounds rather than the 1,2-dihydro-2-oxo-4-pyridyl structure IV, although it is understood that either or both structures are comprehended for these compounds.

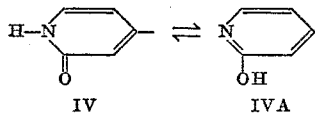

The preparation of the 1-R$_1$-1,4-dihydro-3-(COOR)-4-oxo-7-PY-quinolines where R$_1$ is lower-alkyl, R is hydrogen or lower-alkyl and PY is Q-1-Q'-4(3 or 2)-piperidyl where Q is from one to four substituents selected from those given above for Formula I, i.e., as R$_2$, R$_3$, R$_5$ and R$_6$, and Q' is hydrogen or lower-alkyl, are prepared by reacting the corresponding 7-[4(3 or 2)-pyridyl] or 7-[1-(lower-alkyl)-4-(3 or 2)-pyridinium] compounds with hydrogen under catalytic hydrogenation conditions using the appropriate catalyst, for example, platinum oxide.

Also within the scope of the invention are 3-carboxylic acid cationic salts of our above-described 1,4-dihydro-1-(lower-alkyl)-4-oxo-7-PY-3-quinolinecarboxylic acids of Formula I where R is hydrogen. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methylglucamine salts. Although medicinally acceptable salts are preferred, other and all cationic salts are within the scope of our invention. All such salts, including those having toxic cations, are useful in characterizing the free acids and as intermediates in purification of the free acids. The salts are prepared from the acids using methods illustrated hereinbelow in the examples.

Our compounds where $n$ is zero, as illustrated by the compounds of Formula I, are useful both in the free base form and in the form of acid-addition salts; and both forms are within the purview of the invention. The acid-addition salts are simply a more convenient form for use; and in practice, use of the salt form inherently amounts to use of the base form. The acids which can be used to prepare the acid-addition salts include preferably those which produce, when combined with the free base, medicinally acceptable salts, that is, salts whose anions are relatively innocuous to the animal organism in medicinal doses of the salts, so that the beneficial antibacterial properties inherent in the free base are not vitiated by side effects ascribable to the anions. In practicing our invention, we found it convenient to form the hydrochloride salts. However, other appropriate medicinally acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, and the like, giving the hydrobromide, hydriodide, nitrate, phosphate, sulfamate, acetate, citrate, tartrate, lactate, methanesulfonate, ethanesulfonate, benzenesulfonate, p-toluenesulfonate and quinate, respectively.

The acid-addition salts of said basic compounds are prepared either by dissolving the free base in aqueous or aqueous-alcohol solution containing the appropriate acid and isolating the salt by evaporating the solution, or by reacting the free base and acid in an organic solvent, in which case the salt separates directly or can be obtained by concentration of the solution.

Although medicinally acceptable salts of said basic compounds are preferred, all acid-addition salts are within the scope of our invention. All acid-addition salts are useful as sources of the free base form even if the particular salt per se is desired only as an intermediate product as for example when the salt is formed only for purposes of purification or identification, or when it is used as an intermediate in preparing a medicinally acceptable salt by ion exchange procedures.

Also encompassed by our invention are quaternary-ammonium salts of the aforesaid 1,4-dihydro-1-(lower-alkyl)-3-(COOR)-4-oxo-7-PY-quinolines, as illustrated by the compounds of Formula I. These salts are useful for further identification of said compounds and, also, are useful as intermediates. For example, the 7-[1-(lower-alkyl)-pyridinium] salts of Formula I where $n$ is zero are used in the preparation of the corresponding 7-[1-(lower-alkyl)-piperidyl] analogs and the 7-[1-(lower-alkoxy)-pyridinium] salts of Formula I where $n$ is 1 are used in the preparation of the corresponding 7-[2-cyanopyridyl] compounds of Formula I where $n$ is zero. The quaternary ammonium salts are obtained by reacting the free base form of the compound of Formula I or pyridyl-N-oxide thereof with a lower-alkyl, lower-alkenyl or benzyl ester of inorganic acids or organic sulphonic acids, including such compounds as methyl chloride, methyl bromide, methyl iodide, ethyl bromide, propyl chloride, isobutyl bromide, allyl chloride, allyl bromide, methyl sulfate, methyl benzenesulfonate, methyl p-toluenesulfonate, benzyl chloride, benzyl bromide, and the like. The quaternary ammonium salts are prepared by mixing the free base or N-oxide thereof and the lower-alkyl, lower-alkenyl or benzyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

The manner and process of making and using the instant invention will now be generally described so as to enable a person skilled in the art of chemistry to make and use the same as follows.

The process aspect of the invention is generally carried out by reacting the intermediate 1,4-dihydro-3-(COOR)-4-oxo-7-PY-quinoline, as illustrated by the compounds of Formula II, preferably with a lower-alkyl ester of a strong inorganic acid or an organic sulfonic acid, said ester having the formula R$_1$-An, where An is an anion of a strong inorganic acid or an organic sulfonic acid, e.g., chloride, bromide, iodide, sulfate, methanesulfonate, benzenesulfonate, and paratoluenesulfonate, and $R_1$ has the meaning given above for Formula I. The chloride, bromide or iodide is preferred because of the ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The purpose of the acid-acceptor is to take up the hydrogen halide (or HAn) which is split out during the course of the reaction. The reaction can be carried out in either the presence or absence of a suitable solvent, but preferably in a solvent such as lower-alkanol, acetone, dioxane, dimethylformamide, dimethyl sulfoxide, or a mixture of solvents, e.g., a mixture of water and a lower-alkanol. The reaction is generally carried out at a temperature between about room temperature (about 25° C.) and 150° C., preferably heating on a steam bath in a stirred mixture of dimethylformamide and anhydrous potassium carbonate.

When R is lower-alkyl, i.e., when the intermediate is a lower-alkyl 1,4-dihydro-4 - oxo-7-PY-3-quinolinecarboxylate, the reaction is conveniently carried out by heating the quinoline ester with a lower-alkyl ester of a strong acid, preferably a lower-alkyl halide, in a nonoqueous solvent, e.g., dimethylformamide, in the presence of anhydrous potassium carbonate to yield the corresponding lower-alkyl 1,4-dihydro-1-(lower-alkyl)-4-oxo-7-PY-3-quinolinecarboxylate. If the final product is desired in acid form, the lower-alkyl ester is readily hydrolyzed by heating it with aqueous potassium or sodium hydroxide solution to obtain the 1,4-dihydro-1-(lower-alkyl)-4-oxo-7-PY-3 - quinolinecarboxylic acid. Alternatively, but with lower-yields, the 1,4-dihydro-4-oxo-7-PY-3-quinolinecarboxylic acid can be 1-alkylated directly as described above preferably using an aqueous lower-alkanol, e.g., ethanol, as the solvent and the acid-acceptor, e.g., potassium carbonate.

The above procedures can be carried out using as the alkylating agent in place of the lower-alkyl ester, $R_1$-An, the corresponding lower-hydroxyalkyl or lower-haloalkyl ester to obtain the corresponding 1-$R_1$ compounds were $R_1$ is lower-hydroxyalkyl or lower-haloalkyl. Alternatively, the 1-(lower-hydroxyalkyl) and 1-(lower-haloalkyl) compounds are prepared stepwise as described above and as illustrated hereinbelow in the specific exemplary disclosure.

Ths intermediate 1,4-dihydro-4-oxo-7-(4-pyridyl)-3-quinolinecarboxylic acids and lower-alkyl esters of Formula II are prepared by generally known procedures, for example, by first reacting 4-(3-aminophenyl)-2-$R_2$-3-$R_3$-5-$R_5$-6-$R_6$-pyridine, where $R_2$, $R_3$, $R_5$ and $R_6$ are defined as in Formula I but not amino or aminomethyl, with di-(lower-alkyl) ethoxymethylenemalonate to form the corresponding di-(lower-alkyl) 3-(2-$R_2$-3-$R_3$-5-$R_5$-6-$R_6$-4-pyridyl)anilinomethylenemalonate, which is then cyclized by heating in a suitable solvent, e.g., Dowtherm A (eutectic mixture of diphenyl and diphenyl ether) or mineral oil, to form the lower-alkyl 1,4-dihydro-4-oxo-7-(2-$R_2$-3-$R_3$-5-$R_5$-6-$R_6$ - 4-pyridyl) - 3-qiuolinecarboxylate which can be readily hydrolyzed to the corresponding acid by acid or alkaline hydrolysis. The 4-(3-aminophenyl)-2-$R_2$-3-$R_3$-5-$R_5$-6-$R_6$-pyridines are either generally known or are prepared by conventional methods illustrated below in the examples. The corresponding 7-[3(or 2)-pyridyl] compounds are similarly prepared.

The N-oxides of our compounds, e.g., those of Formula I, i.e., the compounds where $n$ is one, are readily prepared by reacting the corresponding compounds where $n$ is zero with an oxidizing agent capable of converting pyridines to pyridine N-oxides, for example, hydrogen peroxide or a per acid such as perbenzoic acids, 3-chloroperbenzoic acid, peractice acid, trifluoroperacetic acid, performic acid, perphthalic acid, or other such oxidizing agents.

Alternatively, the final products of the invention can be prepared by a variety of procedures utilizing other 1-(lower-alkyl)-3-(COOR)-1,4-dihydro - 4 - oxo-7-PY-quinolines where R is hydrogen or lower-alkyl. Thus, compounds of the Formula I also are useful in the preparation of other compounds of Formula I having a different meaning for one or more of $R_2$, $R_3$, $R_5$ and $R_6$. For example, these procedures are illustrated as follows in terms of the conversions effected in the 7-(4-pyridyl) substituent as follows: by reacting a 7-(4-pyridyl) N-oxide with dimethyl sulfate to form the 7-(1-methoxy-4-pyridinium) methosulfate which is reacted with an alkali cyanide, e.g., NaCN, to form the corresponidng 7-(2-cyano-4-pyridyl) compound; by hydrolyzing 7-(2-cyano-4-pyridyl) with aqueous alkali to form 7-(2-carboxy-4-pyridyl); by reductively alkanoylating 7-(2-cyano-4-pyridyl) to produce 7-[2-(lower-alkanoylaminomethyl)-4-pyridyl] which can be hydrolyzed to form 7-(2-aminomethyl-4-pyridyl); by reacting 7-(2,6-dimethyl-4-pyridyl) N-oxide with a lower-alkanoic acid anhydride to form 7-(2-lower-alkanoyloxymethyl-6-methyl-4-pyridyl) which can be hydrolyzed to 7-(2-hydroxymethyl-6-methyl-4-pyridyl); by reacting 7-(2-hydroxymethyl-6-methyl-4-pyridyl) N-oxide with lower-alkanoic acid anhydride to yield 7-[2,6-bis(lower-alkanoyloxymethyl)-4-pyridyl] which can be hydrolyzed to 7-[2,6-bis(hydroxymethyl)-4-pyridyl]; by reacting 7-(2-cyano-4-pyridyl) with polyphosphoric acid to give 7-(2-carbamyl-4-pyridyl); by reacting 7-(2-carbamyl-4-pyridyl) with lead tetraaceate and triethylamine to give 7-(2-amino-4-pyridyl); by reacting 7-(4-pyridyl) N-oxide, i.e., same as 7-(1-oxido-4-pyridyl), with a lower-alkanoic acid anhydride to form 7-[2-(lower-alkanoyloxy)-4-pyridyl] which is hydrolyzed with aqueous mineral acid, e.g., hydrochloric acid, to yield 7-(2-hydroxy-4-pyridyl); by reacting 7-(2-hydroxy-4-pyridyl) with a lower-alkylating agent, e.g., lower-diazoalkane or alkali lower-alkoxide to produce 7-[2-lower-alkoxy) - 4 - pyridyl]; by halogenating 7-(2-hydroxy-4-pyridyl) to produce 7-(2-halo-4-pyridyl).

The molecular structures of the final products and intermediates of the invention are established by their mode of synthesis and confirmed by the correspondence of calculated and found values for the elementary analyses for representative examples and by infrared, ultraviolet and NMR spectral analyses.

The 1,4 - dihydro-1-$R_1$-4-oxo-7-pyridyl-3-quinolinecarboxylic acids and lower-alkyl esters of the invention, e.g., the compounds of Formula I, when tested according to standard in vitro bacteriological evaluation procedures possess antibacterial activity, for example, against organisms such as Staphylococcus aureus, Pseudomonas eruginosa, Klebsiella pneumoniae, Escherichia coli and Proteus vulgaris, at concentrations in the range of about 0.01 to 250 mcg. per ml. Also, said compounds of our invention when tested according to standard in vivo bacteriological evaluation procedures in mice were found to have significant activity against bacteria, e.g., Staphylococcus aureus, Escherichia coli and Klebsiella pneumoniae, when administered orally and/or subcutaneously at dose levels in the range of about 3 to 200 mg. per kg. per day for 7 to 13 days.

The following examples will further illustrate the invention without, however, limiting it thereto.

EXAMPLE 1A 1-ethyl-1,4-dihydro-4-oxo-7-(4-pyridyl) - 3 - quinolinecarboxylic acid.—To a stirred suspension containing 5.1 g. of 57% sodium hydride dispersed in mineral oil and 150 ml. of dimethylformamide was added in portions 32.6 g. of ethyl 1,4-dihydro-4-oxo-7-(4-pyridyl)-3-quinolinecarboxylate [tautomeric with ethyl 4-hydroxy-7-(4-pyridyl)-3-quinolinecarboxylate] followed by the addition of 18.7 g. of ethyl iodide. The resulting reaction mixture was heated on a steam bath for three hours with stirring and then concentrated in vacuo to remove the solvent. The semi-solid residue was shaken well with a mixture of chloroform and water, and a small quantity of amorphous brown solid was filtered off. The layers were separated and the chloroform layer was evaporated in vacuo to remove the chloroform. To the oily residue containing ethyl 1-ethyl-1,4-dihydro-4-oxo-7-(4-pyridyl) - 3 - quinolinecarboxylate was added excess 10% aqueous sodium hydroxide solution and ethanol, and the solution was heated on a steam bath for forty-five minutes to hydrolyze the ethyl ester to the corresponding carboxylic acid. The alkaline solution was diluted to a volume of about 500 ml. with water, decolorizing charcoal was added and the mixture filtered. The filtrate was neutralized with acetic acid whereupon the carboxylic acid separated as a solid. The solid was collected and dried in a rotary evaporator. The solid was boiled with ethanol, the solution chilled and the resulting solid collected. The solid was recrystallized from dimethylformamide (about 150 ml.) using decolorizing charcoal. The filtrate was chilled, diluted with about one-half volume of ethanol and the separated crystalline product was collected, recrystallized again from dimethylformamide and dried in vacuo to yield 4.3 g. of 1-ethyl-1,4-dihydro-4-oxo-7-(4-pyridyl)-3-quinolinecarboxylic acid, M.P. 272–273° C. Further recrystallization of this compound from dimethylformamide raised its melting point to 290° C.

The above intermediate 1,4-dihydro-4-oxo-7-(4-pyridyl)-3-quinolinecarboxylic acid was prepared in three steps starting with 4-(3-nitrophenyl)pyridine according to the procedure described below in Examples 1B, 1C and 1D.

EXAMPLE 1B 4-(3-aminophenyl)pyridine.—A mixture containing 250 ml. of ethanol, 50 ml. of water, 13 ml. of acetic acid and 30.6 g. of iron powder was refluxed with stirring. The heat was removed and to the mixture was added in portions with stirring 35.0 g. of 4-(3-nitrophenyl)-pyridine at a rate causing the reaction mixture to reflux. After addition of the reactant had been completed, the reaction mixture was refluxed for an additional three hours. To the mixture was then added slowly 15 g. of solid sodium carbonate followed by infusorial earth. The resulting mixture was stirred for fifteen minutes and filtered while hot, washing the filtrate cake with hot ethanol. The combined filtrate and washings were concentrated in vacuo. The remaining solid was washed with water, collected and recrystallized from methanol-acetonitrile to yield 25.0 g. of 4-(3-aminophenyl)-pyridine, M.P. 162–164° C.

EXAMPLE 1C

Diethyl 3 - (4-pyridyl)anilinomethylenemalonate.—A mixture containing 25.0 g. of 4-(3-aminophenyl)pyridine and 31.8 g. of diethyl ethoxymethylenemalonate was heated to 135° C. and held at that temperature for five minutes. Ethanol was evolved and the remaining material was diethyl 3-(4-pyridyl)anilinomethylenemalonate which was used directly in the following preparation (Example 1D). In another run of this preparation (Example 1C), a mixture containing 112 g. of 4-(3-aminophenyl)pyridine and 148 g. of diethyl ethoxymethylenemalonate was heated for eight minutes at 130° C., cooled to about 110° C. and 100 ml. of isopropyl alcohol added. The resulting solution was treated with cyclohexane until almost cloudy, treated with decolorizing charcoal, filtered and cooled. The solid that separated was collected to yield 205 g. of diethyl 3-(4-pyridyl)anilinomethylenemalonate, M.P. 86–88° C.

EXAMPLE 1D

Ethyl 1,4 - dihydro-4-oxo-7-(4-pyridyl)-3-quinolinecarboxylate.—Two 250-ml. portions of Dowtherm A (eutectic mixture of diphenyl and diphenyl ether) were heated to boiling. To each was added 25 g. of diethyl 3-(4-pyridyl)-anilinomethylenemalonate and boiling was continued for twelve minutes and the reaction mixture then allowed to cool. To each cooled mixture containing crystals was added an equivalent volume of n-hexane and the crystalline material was collected, combined and washed well with ether to yield 32.6 g. of ethyl 1,4-dihydro-4-oxo-7-(4-pyridyl) - 3 - quinolinecarboxylate, M.P. 242–245° C. with decomposition.

EXAMPLE 2

Ethyl 1-ethyl-1,4-dihydro-4-oxo-7-(4-pyridyl)-3-quinolinecarboxylate.—To 100 g. of ethyl 1,4-dihydro-4-oxo-7-(4-pyridyl)-3-quinolinecarboxylate slurried in one liter of dimethylformamide was added 165 g. of anhydrous potassium carbonate. The mixture was warmed to 60° C. and after stirring at that temperature for fifteen minutes, 52.5 g. of diethyl sulfate was added and the resulting mixture was stirred at 60° C. for one hour. The dimethylformamide was removed in vacuo at 60–65° C. and the residue was stirred for ten to fifteen minutes with cold water and the solid collected. The solid was taken up with a mixture of water and chloroform. The chloroform layer was separated and the chloroform evaporated in vacuo. The remaining oil was dissolved in about one liter of isopropyl alcohol, the hot solution treated with decolorizing charcoal and filtered, and the filtrate chilled. The resulting crystalline precipitate was collected to give 49 g. of ethyl 1-ethyl-1,4-dihydro-4-oxo-7-(4-pyridyl)-3-quinolinecarboxylate. A small sample of the product melted at 169–170.5° C. after recrystallization from isopropyl alcohol and drying at room temperature.

A sample of the above ester was readily converted to the corresponding carboxylic acid by alkaline hydrolysis as follows: A mixture containing 41 g. of ethyl 1-ethyl-1,4 - dihydro-4-oxo-7-(4-pyridyl)-3-quinolinecarboxylate and 400 ml. of 10% aqueous potassium hydroxide solution was vigorously stirred on a steam bath for one hour. To the hot reaction mixture was added decolorizing charcoal, the mixture filtered and the filtrate carefully acidified with glacial acetic acid to a pH of 6 and then allowed to cool. The resulting yellow solid was collected, washed with water and dried at 60° C. to yield 33 g. of 1-ethyl-1,4-dihydro-4-oxo-7-(4-pyridyl)-3-quinolinecarboxylic acid, M.P. 284–286° C.

EXAMPLE 3

1,4-dihydro-4-oxo-1-n-propyl-7-(4-pyridyl)-3-quinolinecarboxylic acid.—A mixture containing 29.4 g. of ethyl 1,4-dihydro-4-oxo-7-(4-pyridyl) - 3 - quinolinecarboxylate, 300 ml. of dimethylformamide and 41.4 g. of anhydrous potassium carbonate was heated with stirring on a steam bath for fifteen minutes, cooled to 60° C., treated with 13.5 g. of n-propyl bromide and the resulting mixture kept at 60–65° C. for three hours with stirring. The reaction mixture was concentrated in vacuo and the residue was taken up in 300 ml. of chloroform. To the chloroform solution was added 200 ml. of water; the mixture was shaken well and filtered to remove a small quantity of solid; and, the layers were then separated. The chloroform layer was washed with water, dried over anhydrous magnesium sulfate and concentrated in vacuo to remove the chloroform. The oily material containing ethyl 1,4-dihydro-4-oxo-1-n-propyl-7-(4-pyridyl) - 3 - quinolinecarboxylate was treated as in Example 1A using an excess of 10% aqueous sodium hydroxide solution and ethanol, and the resulting mixture was heated on a steam bath for forty-five minutes to hydrolyze the ethyl ester to the corresponding carboxylic acid. The alkaline solution was diluted as in Example 1A with water, decolorizing charcoal was added, and the mixture was filtered. The filtrate was neutralized with acetic acid whereupon the carboxylic acid precipitated. The precipitate was recrystallized twice from dimethylformamide, washed successively with cold dimethylformamide, acetonitrile and ether, and then dried in vacuo at 100° C. to yield 11.1 g. of 1,4-dihydro-4-oxo-1-n-propyl-7-(4-pyridyl) - 3 - quinolinecarboxylic acid, M.P. 295–297° C. with decomposition.

EXAMPLE 4

1,4-dihydro-1-methyl-4-oxo-7-(4-pyridyl)-3 - quinolinecarboxylic acid, 7.8 g., M.P. 329–330° C. with decomposition, was prepared following the procedure described in Example 3 using 25.0 g. of ethyl 1,4-dihydro-4-oxo-7-(4-pyridyl)-3-quinolinecarboxylate, 250 ml. of dimethylformamide, 34.2 g. of anhydrous potassium carbonate, 10.75 g. of dimethyl sulfate and recrystallization from dimethylformamide.

EXAMPLE 5A 1-ethyl-1,4-dihydro-4-oxo-7-(3-pyridyl)-3-quinolinecarboxylic acid.—To a vigorously stirred mixture heated on a water bath to 60° C. and containing 25.5 g. of ethyl 1,4-dihydro-4-oxo-7-(3-pyridyl)-3 - quinolinecarboxylate, 250 ml. of dimethylformamide and 36.0 g. of anhydrous potassium carbonate was added 13.4 g. of diethyl sulfate. The resulting mixture was stirred at 60° C. for thirty minutes and then concentrated in vacuo to remove the dimethylformamide. The remaining solid residue was taken up in hot chloroform, the mixture filtered to remove the insoluble material and the latter washed with chloroform. The combined filtrate and chloroform washings were washed with water and the chloroform removed in vacuo. The residue containing ethyl 1-ethyl-1,4-dihydro-4-oxo-7-(3-pyridyl)-3-quinolinecarboxylate was taken up in 75 ml. of hot ethanol and to the solution was added 25 ml. of 35% aqueous sodium hydroxide solution and 25 ml. of water. The solution was heated on a steam bath for one hour and the ethanol was then allowed to evaporate. The remaining solution was diluted with an equal volume of water and the solution acidified with acetic acid. The resulting solid was collected, washed successively with water and ethanol, and recrystallized twice from dimethylformamide using decolorizing charcoal each time to yield 9.0 g. of 1-ethyl-1,4-dihydro-4-oxo-7-(3-pyridyl)-3-quinolinecarboxylic acid, M.P. 268–269° C. with decomposition.

The above intermediate ethyl 1,4-dihydro-4-oxo-7-(3-pyridyl)-3-quinolinecarboxylate was prepared in two steps starting with 3-(3-aminophenyl)pyridine according to the procedure described below in Examples 5B and 5C.

EXAMPLE 5B

Diethyl 3 - (3 - pyridyl)anilinomethylenemalonate.—A mixture containing 17.3 g. of 3-(3-aminophenyl)pyridine and 22.6 g. of diethyl ethoxymethylenemalonate was heated to 135° and held at that temperature for about five minutes whereupon ethanol was evolved. On cooling there crystallized diethyl 3 - (3 - pyridyl)anilinomethylenemalonate. A small portion of this intermediate was recrystallized from cyclohexaneisopropyl acetate using decolorizing charcoal to give the purified product melting at 84–86° C. The remainder of the material was used directly in the following preparation (Example 5C) without any further purification.

EXAMPLE 5C

Ethyl 1,4-dihydro-4-oxo-7-(3-pyridyl)-3 - quinolinecarboxylate.—The diethyl 3-(3 - pyridyl)anilinomethylenemalonate prepared in Example 5B was mixed with 350 ml. of Dowtherm A; the mixture was heated to boiling, boiled for twelve minutes and allowed to cool whereupon a solid crystallized. The mixture was diluted with an equal volume of ether. The solid was collected and washed with ether to yield 25.5 g. of ethyl 1,4-dihydro-4-oxo-7-(3-pyridyl)-3-quinolinecarboxylate, M.P. 253–256° C.

EXAMPLE 6A

1 - ethyl - 1,4 - dihydro - 7 - (2,6-dimethyl-4-pyridyl)-4 - oxo - 3 - quinolinecarboxylic acid.—A mixture containing 7.9 g. of ethyl 1,4 - dihydro - 7 - (2,6-dimethyl-4-pyridyl) - 4 - oxo-3-quinolinecarboxylate, 70 ml. of dimethylformamide and 3.38 g. of anhydrous potassium carbonate was stirred on a steam bath for thirty minutes; 10 ml. of ethyl iodide was added; and, the reaction mixture was heated on the steam bath for three and one-half hours with stirring and then allowed to stand overnight at room temperature. The reaction mixture was concentrated in vacuo to remove the solvent and excess ethyl iodide. The remaining residue was taken up in hot chloroform, and the hot solution filtered and the filtrate evaporated in vacuo to remove the chloroform. To the semisolid residue was added 75 ml. of 10% aqueous sodium hydroxide solution. The alkaline solution was heated on the steam bath for two hours, treated with decolorizing charcoal and filtered. The filtrate was neutralized with acetic acid, the resulting precipitate was collected, air-dried and recrystallized once from acetonitrile using decolorizing charcoal and once from dimethylformamide using decolorizing charcoal to yield 1.9 g. of 1-ethyl-1,4-dihydro - 7 - (2,6 - dimethyl-4-pyridyl)-4-oxo-3-quinolinecarboxylic acid, M.P. 282–284° C. with decomposition.

The above intermediate ethyl 1,4-dihydro-7-(2,6-dimethyl - 4 - pyridyl)-4-oxo-3-quinolinecarboxylate was prepared in two steps as described below in Examples 6B and 6C starting with 4-(3-aminophenyl)-2,6-dimethylpyridine.

EXAMPLE 6B

Diethyl 3 - (2,6 - dimethyl-4-pyridyl)anilinomethylenemalonate.—A mixture containing 5.5 g. of 4-(3-aminophenyl) - 2,6 - dimethylpyridine and 6.05 g. of diethyl ethoxymethylenemalonate was heated to 135° C., held at that temperature for five minutes and then allowed to cool to yield 10.2 g. of diethyl 3-(2,6-dimethyl-4-pyridyl) anilinomethylenemalonate, which was used directly in the following preparation (Example 6C).

EXAMPLE 6C

Ethyl 1,4 - dihydro - 7 - (2,6-dimethyl-4-pyridyl)-3-quinolinecarboxylate.—To 100 ml. of an eutectic mixture of diphenyl and diphenyl ether (Dowtherm A) was added 10.2 g. of diethyl 3-(2,6 - dimethyl - 4-pyridyl) anilinomethylenemalonate; the mixture was boiled for twenty-five minutes and then allowed to cool. To the cooled mixture containing crystals was added an equivalent volume of n-hexane and the crystalline solid was collected and washed well with ether to yield 7.9 g. of ethyl 1,4-dihydro - 7 - (2,6 - dimethyl - 4 - pyridyl)-3-quinolinecarboxylate.

EXAMPLE 7A

Ethyl 7 - [3,5 - bis-(ethoxycarbonyl)-2,6-dimethyl-4-pyridyl] - 1 - ethyl - 1,4 - dihydro-4-oxo-3-quinolinecarboxylate.—To a stirred mixture containing 12.54 g. of ethyl 7 - [3,5 - bis(ethoxycarbonyl) - 2,6 - dimethyl-4-pyridyl] - 1,4 - dihydro - 4 - oxo-3-quinolinecarboxylate, 125 ml. of dimethylformamide and 11.51 g. of anhydrous potassium carbonate heated to 60° C. in a water bath was added dropwise over a period of about five minutes 4.63 g. of diethyl sulfate. The reaction mixture was then heated at 60° C. with stirring for one hour, allowed to cool and filtered. The filtrate was evaporated in vacuo at 60° C.; the residue was taken up in chloroform and filtered; and, the chloroform solution was washed with water, dried over anhydrous magnesium sulfate, treated with decolorizing charcoal and filtered, and the filtrate evaporated to yield an oil which crystallized. After a recrystallization from isopropyl acetate did not remove some unreacted starting material, the crystalline solid was mixed with 11.51 g. of anhydrous potassium carbonate, 125 ml. of dimethylformamide and 1 g. of diethyl sulfate and the mixture heated with stirring at 60° C. for sixty minutes and again worked up as above. After an unsuccessful purification attempt by recrystallizing the resulting crystalline solid from isopropyl acetate, it was recrystallized from ethyl acetate to yield 8.57 g. of ethyl 7-[3,5-bis(ethoxycarbonyl) - 2,6 - dimethyl - 4 - pyridyl]-1-ethyl-1,4-dihydro-4-oxo-3-quinolinecarboxylate, M.P. 179–181° C.

The preparation of the above intermediate ethyl 7-[3,5-bis(ethoxycarbonyl) - 2,6 - dimethyl - 4 - pyridyl]-1,4-dihydro-4-oxo-3-quinolinecarboxylate was prepared in two steps starting with 4-(3-aminophenyl)-3,5-bis(ethoxycarbonyl)-2,6-dimethylpyridine according to the procedure described in Examples 7B and 7C.

EXAMPLE 7B

Diethyl 3 - [3,5 - bis(ethoxycarbonyl)-2,6-dimethyl-4-pyridyl]anilinomethylenemalonate.—A mixture containing 21.3 g. of 4 - (3-aminophenyl)-3,5-bis(ethoxycarbonyl) - 2,6 - dimethylpyridine and 13.42 g. of diethyl ethoxymethylenemalonate was heated to 105° C. whereupon an exothermic reaction ensued raising the temperature to 125° C. The reaction mixture was then heated at 125° C. for several minutes and was allowed to cool. There was thus obtained, as an oil, 32.4 g. of diethyl 3-[3,5 - bis(ethoxycarbonyl) - 2,6 - dimethyl-4- pyridyl] anilinomethylenemalonate, which was used directly in the following preparation (Example 7C).

EXAMPLE 7C

Ethyl 7 - [3,5 - bis(ethoxycarbonyl)-2,6-dimethyl-4-pyridyl] - 1,4 - dihydro - 4-oxo-3-quinolinecarboxylate.—To 400 ml. of boiling Dowtherm A was added with stirring 32.4 g. of diethyl 3 - [3,5 - bis(ethoxycarbonyl)-2,6-dimethyl - 4 - pyridyl]anilinomethylenemalonate and the resulting mixture was boiled with stirring for twenty-five minutes and then allowed to cool. There was added an equivalent volume of n-hexane and the mixture was cooled in an ice bath. The resulting solid was collected, washed successively with n-heptane and ether, dried, recrystallized once from acetonitrile and then recrystallized from acetone to yield 7.0 g. of ethyl 7 - [3,5-bis(ethoxycarbonyl)-2,6 - dimethyl - 4-pyridyl]-1,4-dihydro-4-oxo-3-quinolinecarboxylate, M.P. 235–239° C. A second crop of 2.68 g. of this compound, M.P. 230–235° C., was also obtained.

EXAMPLE 8A

Ethyl 1 - ethyl - 1,4-dihydro-7-(2-methyl-4-pyridyl)-4-oxo - 3 - quinolinecarboxylate.—A mixture containing 19.5 g. of ethyl 1,4-dihydro-7-(2-methyl-4-pyridyl)-4-oxo-3-quinolinecarboxylate, 200 ml. of dimethylformamide and 26.3 g. of anhydrous potassium carbonate was heated to 60° C. in a water bath with stirring and to the stirred mixture kept at 60° C. was added over a period of about five minutes 10.74 g. of diethyl sulfate. The reaction mixture was stirred at the same temperature for two and one-half hours and then evaporated in vacuo. The residue was taken up in a mixture of chloroform and water; the chloroform layer was separated, dried over anhydrous magnesium sulfate, treated with decolorizing charcoal and filtered; and, the filtrate was evaporated to remove the chloroform. The residual semi-solid solidified by triturating with ether. The solid was purified by recrystallization from acetonitrile, a second recrystallization from methyl isobutyl ketone and then dissolving it in methylene dichloride, treating with decolorizing charcoal and filtering, repeating the charcoaling, and then evaporating the resulting yellow filtrate to yield 5.46 g. of ethyl 1 - ethyl - 1,4 - dihydro - 7-(2-methyl-4-pyridyl)-4-oxo-3-quinolinecarboxylate, M.P. 185–188° C.

The above intermediate ethyl 1,4 - dihydro - 7 - (2-methyl - 4 - pyridyl)-4-oxo-3-quinolinecarboxylate was prepared in seven steps starting with 2,6 - dimethyl - 4-(3-nitrophenyl)pyridine as described hereinbelow in Examples 8C–8I.

The above product of Example 8A was readily converted into the corresponding 3-quinolinecarboxylic acid as described in Example 8B.

EXAMPLE 8B

1 - ethyl - 1,4 - dihydro - 7 - (2 - methyl - 4 - pyridyl)-4 - oxo - 3 - quinolinecarboxylic acid.—A mixture containing 7.99 g. of ethyl 1-ethyl - 1,4 - dihydro - 7 - (2-methyl - 4 - pyridyl) - 4 - oxo - 3 - quinolinecarboxylate, 100 ml. of water and 30 ml. of concentrated hydrochloric acid was heated to reflux with stirring and was stirred at reflux for thirty minutes. The hot reaction mixture was filtered whereupon needles shortly began to separate. The mixture was evaporated in vacuo to a small volume and the solid was collected. The solid was recrystallized from methanol (about 1500 ml.), adding ether to the warm filtrate until slight clouding, and then allowing the solution to cool. The crystalline product was collected to yield 6.26 g. of 1-ethyl - 1,4 - dihydro - 7 - (2 - methyl-4-pyridyl)-4-oxo-3-quinolinecarboxylic acid, as its hydrochloride, M.P. 302–303° C. with decomposition.

EXAMPLE 8C 2,6 - dimethyl - 4 - (3-nitrophenyl)pyridine N-oxide.—To a stirred mixture containing 34.0 g. of 2,6-dimethyl-4-(3 - nitrophenyl)pyridine and 149 ml. of acetic acid was added 45 ml. of 30% hydrogen peroxide and the resulting reaction mixture was heated on a steam bath for three hours and then allowed to cool whereupon the crystalline product separated. The mixture was diluted with water; the precipitate was collected, washed with water and dried to yield 38.3 g. of 2,6 - dimethyl - 4 - (3 - nitrophenyl)pyridine N-oxide, M.P. 235–238° C.

EXAMPLE 8D

6 - methyl - 4 - (3-nitrophenyl)pyridine-2-methanol.—A 157 ml. portion of acetic anhydride was heated to reflux, the heat removed, and to the hot anhydride was slowly added with stirring 38.3 g. of 2,6-dimethyl-4-(3-nitrophenyl)pyridine N-oxide. The reaction mixture was refluxed for thirty minutes and then allowed to cool. Ethanol was added to decompose the excess acetic anhydride and the material was evaporated in vacuo. The remaining oil containing 2 - acetoxymethyl - 6 - methyl - 4-(3-nitrophenyl)pyridine was refluxed for one hour with 160 ml. of concentrated hydrochloric acid and the mixture evaporated in vacuo. The residue was taken up in water and the resulting solution was treated with decolorizing charcoal and filtered. The charcoal treatment was repeated another two times. The filtrate was made basic with concentrated ammonium hydroxide. The yellow precipitate was collected, washed with water and recrystallized from 1:1 methanol:water (about three liters) using decolorizing charcoal, washed with water and dried to yield 21.0 g. of 6-methyl - 4 - (3 - nitrophenyl) pyridine - 2 - methanol, M.P. 152–155° C.

EXAMPLE 8E

6 - methyl - 4 - (3-nitrophenyl)pyridine-2-aldehyde.—A mixture containing 21.0 g. of 6-methyl-4-(3-nitrophenyl) pyridine - 2 - methanol, 520 ml. of chloroform and 41.7 g. of activated manganese dioxide was refluxed with stirring having a continuous water separator attached to the reaction vessel. After six hours of refluxing, the theoretical quantity of water had been collected. The reaction mixture was filtered while hot and the filter cake was washed with 400 ml. of hot chloroform. The combined filtrate and washings were treated with decolorizing charcoal, the mixture filtered, and the filtrate evaporated to yield a solid which was then recrystallized from acetone (about two liters) using decolorizing charcoal to yield 15.9 g. of 6-methyl - 4 - (3-nitrophenyl)pyridine-2-aldehyde, M.P. 193–195° C.

EXAMPLE 8F

2 - methyl - 4 - (3 - nitrophenyl)pyridine.—A stirred mixture containing 18.9 g. of 6-methyl-4-(3-nitrophenyl)pyridine-2-aldehyde, 150 ml. of Dowtherm A and 1.89 g. of 10% palladium-on-charcoal was flushed with nitrogen and heated whereupon there was rapid gas evolution at 150° C. The mixture was then heated with stirring to 190° C. and kept at that temperature for twenty minutes until the evolution of gas ceased. The reaction mixture was allowed to cool, it was then diluted with benzene and the mixture was filtered. The filtrate was extracted with 3 N hydrochloric acid, the acidic extract was extracted with benzene and the benzene extract was discarded. The acidic solution was treated with decolorizing charcoal and filtered. The filtrate was made basic with concentrated ammonium hydroxide solution and the white solid that separated was extracted with chloroform. The chloroform extract was dried over anhydrous magnesium sulfate, treated with decolorizing charcoal, filtered, and the filtrate evaporated in vacuo and the solid residue dried in a vacuum oven to yield 4.30 g. of 2-methyl-4-(3-nitrophenyl)pyridine.

EXAMPLE 8G

4 - (3 - aminophenyl) - 2 - methylpyridine.—A mixture containing 15.7 g. of 2-methyl-4-(3-nitrophenyl)pyridine, 600 ml. of dimethylformamide and 0.59 g. of 10% palladium-on-charcoal was hydrogenated under pressure, the theoretical quantity of hydrogen being consumed in about one hour. The reaction mixture was filtered and the filtrate evaporated. The crystalline residue was taken up in methanol; the methanol solution was treated with decolorizing charcoal and filtered; and, the filtrate was evaporated to yield 13.0 g. of 4-(3-aminophenyl)-2-methylpyridine, M.P. 105–111° C.

EXAMPLE 8H

Diethyl 3-(2 - methyl - 4 - pyridyl)anilinomethylenemalonate.—A mixture containing 14.9 g. of 4-(3-aminophenyl)-2-methylpyridine and 17.7 g. of diethyl ethoxymethylenemalonate was heated to about 100° C. whereupon an exothermic reaction ensued and the heat source was removed. When the temperature fell again to 100° C., the reaction mixture was heated and the temperature kept between 115–125° C. for about five minutes. On cooling there was obtained, as an oil, diethyl 3-(2-methyl-4-pyridyl)anilinomethylenemalonate which was used directly in Example 8I.

EXAMPLE 8I

Ethyl 1,4 - dihydro - 7 - (2 - methyl -4-pyridyl)-4-oxo-3-quinolinecarboxylate.—To 300 ml. boiling Dowtherm A was added the product of Example 8H and boiling was continued for twelve minutes. The reaction mixture was then cooled, diluted with an equivalent volume of n-hexane, and the precipitate was collected and washed well with ether to yield 21.8 g. of ethyl 1,4-dihydro-7-(2-methyl-4-pyridyl)-4-oxo-3-quinolinecarboxylate.

EXAMPLE 9

1-ethyl-1,4-dihydro-4-oxo-7-(4-pyridyl)-3-quinolinecarboxylic acid N-oxide.—A mixture containing 8.3 g. of 1-ethyl-1,4-dihydro-4-oxo-7-(4-pyridyl)-3-quinolinecarboxylic acid, 100 ml. of acetic anhydride and 30% hydrogen peroxide was heated on a steam bath for three hours and then concentrated in vacuo. The remaining solid was boiled with 100 ml. of dimethylformamide and allowed to stand until cold. The solid was collected and washed successively with dimethylformamide and acetonitrile to yield 7.0 g. of 1-ethyl-1,4-dihydro-4-oxo-7-(4-pyridyl)-3-quinolinecarboxylic acid N-oxide, M.P. 301–302° C. This product was combined with a 3.1 g. portion of the same product prepared in the same way and was purified further as follows: The 10.1 g. of product was dissolved in 60 ml. of hot formic acid and the hot solution was filtered through a sintered glass funnel. The filtrate was diluted to 200 ml. with acetonitrile whereupon the product separated as white crystalline needles which were collected and dried in a vacuum oven at 80° C. to yield 3.5 g. of 1-ethyl-1,4-dihydro-4-oxo-7-(4-pyridyl)-3-quinolinecarboxylic acid N-oxide, M.P. 307–309° C. with decomposition.

EXAMPLE 10

Ethyl 1 - ethyl-1,4-dihydro-4-oxo-7-(4-pyridyl)-3-quinolinecarboxylate N-oxide.—A mixture containing 18.0 g. of ethyl 1-ethyl-1,4-dihydro-4-oxo-7-(4-pyridyl)-3-quinolinecarboxylate, 12.2 g. of 85% 3-chloroperbenzoic acid and 250 ml. of methylene dichloride was stirred for two hours at room temperature. The reaction mixture was concentrated in vacuo and the remaining solid was boiled with a mixture of 25 ml. of dimethylformamide in 100 ml. of methanol for five minutes and then allowed to stand overnight. The crystalline solid was collected and then stirred with a warm solution containing sodium bicarbonate. The white solid was collected, washed with water, air-dried and then dried in vacuo to yield 11.5 g. of ethyl 1-ethyl-1,4-dihydro-4-oxo-7-(4-pyridyl)-3-quinolinecarboxylate N-oxide, M.P. 216–218° C.

EXAMPLE 11

Ethyl 7-(2-cyano-4-pyridyl)-1-ethyl-1,4-dihydro-4-oxo-3-quinolinecarboxylate.—A mixture containing 9.2 g. of ethyl 1-ethyl-1,4-dihydro-4-oxo-7-(4-pyridyl)-3-quinolinecarboxylate N-oxide, 6.3 g. of dimethyl sulfate and 25 ml. of acetonitrile was heated to reflux with stirring. Another 2 g. of dimethyl sulfate was added and refluxing was continued for another thirty-five minutes. The reaction mixture was chilled and the solid was collected, washed with acetonitrile and dried in vacuo. The solid, 4-(3-carbethoxy-1-ethyl-1,4-dihydro-4-oxo-7-quinolyl)-N-methoxypyridinium methosulfate, was suspended in 75 ml. of water and to this stirred suspension was added 9.75 g. of potassium cyanide in 50 ml. of water. On standing there separated as a white solid, ethyl 7-(2-cyano-1,2-dihydro-1-methoxy-4-pyridyl)-1-ethyl-1,4-dihydro-4-oxo-3-quinolinecarboxylate, which was collected and washed with water. The solid was slurried with ethanol and the mixture concentrated in vacuo. The residue was boiled with 300 ml. of acetonitrile and chilled. The solid that separated was recrystallized from dimethylformamide-acetonitrile to yield 7.0 g. of ethyl 7-(2-cyano-4-pyridyl)-1 - ethyl-1,4-dihydro-4-oxo-3-quinolinecarboxylate, M.P. 253–256° C. Recrystallization again from the same solvents raised the melting point to 258–261° C.

EXAMPLE 12

7 - (2 - carboxy-4-pyridyl)-1-ethyl-1,4-dihydro-4-oxo-3-quinolinecarboxylic acid.—A mixture containing 7.0 g. of ethyl 7 - (2-cyano-4-pyridyl)-1-ethyl-1,4-dihydro-4-oxo-3-quinolinecarboxylate, 20 ml. of 10% aqueous sodium hydroxide solution and 30 ml. of water was heated on a steam bath with stirring for thirty minutes and then refluxed for ninety minutes. The reaction mixture was diluted with an equal volume of water and filtered. The filtrate was acidified with acetic acid and the separated solid was collected, washed with water and air-dried. The solid was boiled with 50 ml. of acetic acid, the mixture cooled and the solid collected. The solid was recrystallized from dimethylformamide to yield 5.3 g. of the desired product containing some unreacted starting material. This solid was dissolved in 50 ml. of 5% aqueous sodium hydroxide solution and the resulting solution was refluxed for one hour and filtered. To the filtrate was added dilute hydrochloric acid; the separated solid was collected and washed with water. The moist solid was dissolved in about 75 ml. of dimethylformamide; the solution was heated to boil off the water and filtered; and, to the filtrate was added an equal volume of ethanol. The separated solid was collected and, when found to contain dimethylformamide, was dissolved in dilute ammonium hydroxide. The basic solution was filtered and to the filtrate was added dilute hydrochloric acid. The separated white solid was collected and dried in vacuo to yield 4.0 g. of 7-(2-carboxy-4-pyridyl)-1-ethyl-1,4-dihydro-4-oxo-3-carboxylic acid, M.P. 246–247° C. with decomposition.

EXAMPLE 13

Ethyl 1-ethyl-1,4-dihydro-7-(2,6-dimethyl-4-pyridyl)-4-oxo-3-quinolinecarboxylate N-oxide.—A mixture containing 23.8 g. of ethyl 1-ethyl-1,4-dihydro-7-(2,6-dimethyl-4-pyridyl)-4-oxo-3-quinolinecarboxylate, 300 ml. of methylene dichloride and 15.2 g. of 85% 3-chloroperbenzoic acid was stirred at room temperature to give a clear solution which was allowed to stand for five hours. The solvent was then allowed to evaporate over the weekend. The remaining solid was washed with ether, recrystallized from a small quantity of dimethylformamide, washed successively with acetonitrile and ether, and dissolved in hot chloroform. The hot chloroform solution was treated with decolorizing charcoal, the mixture filtered, the filtrate concentrated in vacuo, and the remaining solid recrystallized from dimethylformamide to yield 15.8 g. of ethyl 1-ethyl-1,4-dihydro-7-(2,6-dimethyl-4-pyridyl)-4-oxo-3-quinolinecarboxylate N-oxide, M.P. 225–230° C.

EXAMPLE 14

1-ethyl-1,4-dihydro-7,(2,6-dimethyl-4-pyridyl)-4-oxo-3-quinolinecarboxylic acid N-oxide.—A mixture containing 7.3 g. of ethyl 1-ethyl-1,4-dihydro-7-(2,6-dimethyl-4-pyridyl)-4-oxo-3-quinolinecarboxylate N-oxide, 50 ml. of water and 10 ml. of concentrated hydrochloric acid was refluxed with stirring for thirty minutes. After about ten minutes of refluxing a crystalline solid separated. The hot reaction mixture was cooled, the solid collected and washed with water. The solid was treated with 1600 ml. of boiling methanol and the hot solution was filtered. The filtrate was concentrated to a volume of 800 ml. which was chilled. The separated solid was collected, recrystallized from dimethylformamide and dried at 100° C. to yield 3.8 g. of 1-ethyl-1,4-dihydro-7-(2,6-dimethyl-4-pyridyl)-4-oxo-3-quinolinecarboxylic acid N-oxide, M.P. 295–296° C. with decomposition.

EXAMPLE 15

1-ethyl-1,4-dihydro-7-(2-hydroxymethyl - 6 - methyl-4-pyridyl)-4-oxo - 3 - quinolinecarboxylic acid.—A 30-ml. portion of acetic anhydride was heated to reflux, the heat removed and 10.0 g. of ethyl 1-ethyl-1,4-dihydro-7-(2,6-dimethyl-4-pyridyl)-4-oxo - 3 - quinolinecarboxylate N-oxide was added in portions with stirring. The reaction mixture was then refluxed for thirty minutes, cooled and then concentrated in vacuo. To the residue was added 20 ml. of methanol which was then removed in vacuo. To the residue containing ethyl 7-(2-acetoxymethyl-6-methyl-4-pyridyl)-1-ethyl-1,4-dihydro - 4 - oxo - 3 - quinolinecarboxylate was added 50 ml. of 6 N hydrochloric acid, the solution was refluxed for one hour, allowed to cool and concentrated in vacuo. The gummy residue was solidified by trituration with hot ethanol. The solid was taken up in water, the aqueous solution treated with decolorizing charcoal and filtered. To the filtrate was added an aqueous solution of sodium acetate. The resulting solid was collected, washed with water, air-dried and dissolved in 400 ml. of boiling ethanol. The hot ethanol solution was treated with decolorizing charcoal and filtered. The filtrate was concentrated to a volume of about 250 ml. and was then chilled. The resulting precipitate was collected and recrystallized successively from acetonitrile (about 300 ml.) using decolorizing charcoal, methanol (about 500 ml.) and then acetonitrile to yield 0.8 g. of 1-ethyl-1,4-dihydro-7-(2-hydroxymethyl - 6 - methyl-4-pyridyl)-4-oxo - 3 - quinolinecarboxylic acid, M.P. 250–251° C. with decomposition.

EXAMPLE 16

Ethyl 7-(2-acetamidomethyl - 4 - pyridyl)-1-ethyl-1,4-dihydro-4-oxo - 3 - quinolinecarboxylate.—A mixture containing 3.47 g. of ethyl 7-(2-cyano-4-pyridyl)-1-ethyl-1,4-dihydro-4-oxo-3-quinolinecarboxylate, 100 ml. of acetic anhydride, 2 g. of anhydrous sodium acetate and about one-quarter of a teaspoon of Raney nickel was treated under pressure with hydrogen in a Parr shaker for eight hours at 50° C. The reaction mixture was filtered and the filtrate concentrated in vacuo. The solid residue was washed with water and extracted with hot dimethylformamide. The dimethylformamide extract was concentrated in vacuo to yield a solid. The solid was recrystallized from ethanol and dried in vacuo to yield 2.2 g. of ethyl 7-(2-acetamidomethyl - 4 - pyridyl)-1-ethyl-1,4-dihydro-4-oxo-3-quinolinecarboxylate, M.P. 197–199° C.

EXAMPLE 17A 1-ethyl-1,4-dihydro - 4 - oxo-7-(2-pyridyl)-3-quinolinecarboxylic acid.—14.0 g., M.P. 239–241° C., was prepared following the procedure described in Example 3 using 40.4 g. of ethyl 1,4-dihydro-4-oxo-7-(2-pyridyl)-3-quinolinecarboxylate, 55 g. of anhydrous potassium carbonate, 400 ml. of dimethylformamide and 21.2 g. of diethyl sulfate to yield first ethyl 1-ethyl-1,4-dihydro - 4 - oxo-7-(2-pyridyl) - 3 - quinolinecarboxylate which was then hydrolyzed with 50 ml. of 10% aqueous sodium hydroxide solution and the mixture acidified with acetic acid as in Example 3 to yield the corresponding 3-quinolinecarboxylic acid which was recrystallized first from isopropyl alcohol, next from about 800 ml. of acetonitrile and finally from dimethylformamide (50 ml.)-acetonitrile (200 ml.), and dried at 100° C. in vacuo.

The above intermediate ethyl 1,4-dihydro-4-oxo-7-(2-pyridyl)-3-quinolinecarboxylate was prepared in two steps starting with 2-(3-aminophenyl)pyridine according to the procedure described below in Examples 17B and 17C. The corresponding 1,4-dihydro - 4 - oxo-7-(2-pyridyl)-3-quinolinecarboxylic acid was prepared by hydrolysis of the corresponding ethyl ester as described in Example 17D.

EXAMPLE 17B

Diethyl 3-(2 - pyridyl)anilinomethylenemalonate, was prepared as in Example 1C using 38.1 g. of 2-(3-aminophenyl)pyridine and 48.5 g. of diethyl ethoxymethylenemalonate.

EXAMPLE 17C

Ethyl 1,4-dihydro - 4 - oxo-7-(2-pyridyl)-3-quinolinecarboxylate.—41.3 g. was prepared following the procedure described in Example 1D using the diethyl 3-(2-pyridyl) anilinomethylenemalonate prepared in Example 17B and 700 ml. of Dowtherm A.

EXAMPLE 17D 1,4-dihydro - 4 - oxo-7-(2-pyridyl)-3-quinolinecarboxylic acid.—A mixture containing 10.3 g. of ethyl 1,4-dihydro - 4 - oxo-7-(2-pyridyl)-3-quinolinecarboxylate and 100 ml. of 10% aqueous potassium hydroxide solution was stirred on a steam bath for about thirty minutes, treated with decolorizing charcoal and filtered. The filtrate was acidified with acetic acid, the separated solid was collected, washed successively with water and ethanol and then recrystallized several times from dimethylformamide and dried in a vacuum oven at 100° C. to yield 5.4 g. of 1,4-dihydro-4-oxo-7-(2-pyridyl)-3-quinolinecarboxylic acid, M.P. 273–274° C. with decomposition.

EXAMPLE 18

1-ethyl-1,4-dihydro - 4 - oxo-7-(4-pyridyl)-3-quinolinecarboxylic acid methochloride.—A mixture containing 16.2 g. of ethyl 1-ethyl-1,4-dihydro-4-oxo-7-(4-pyridyl)-3-quinolinecarboxylate and 250 ml. of acetonitrile was refluxed with stirring to effect dissolution and to the hot solution was added with stirring 20 ml. of methyl iodide. The mixture was refluxed with stirring for thirty minutes and then concentrated in vacuo. The solid residue was taken up in warm water (about 300 ml.) and passed through a column (2 x 30 cm.) of an ion exchange resin supplying chloride ions (IRA–400) and eluting the column with methanol. The methanol filtrate was concentrated in vacuo and the remaining solvent was treated with 125 ml. of absolute ethanol and 125 ml. 6 N hydrochloric acid. The resulting mixture was refluxed for four hours and then concentrated in vacuo. The solid residue was recrystallized from water using decolorizing charcoal, dried in vacuo, and boiled with 100 ml. of dimethylformamide to remove some yellow color. After drying the remaining crystalline solid in vacuo, there was obtained 13.3 g. of 1-ethyl-1,4-dihydro - 4 - oxo-7-(4-pyridyl)-3-quinolinecarboxylic acid methochloride, M.P. 282–284° C. Alternatively, this compound can be named as 4-(3-carboxy-1-ethyl-1,4-dihydro - 4 - oxo-7-quinolyl)-1-methylpyridinium chloride.

EXAMPLE 19

Ethyl 1-ethyl-1,4-dihydro - 4 - oxo - 7 - (4-pyridyl)-3-quinolinecarboxylate methiodide.—A mixture containing 9.66 g. of ethyl ethyl-1,4-dihydro-4-oxo-7-(4-pyridyl)-3-quinolinecarboxylate and 150 ml. of acetonitrile was refluxed with stirring and to the resulting clear solution was added 10 ml. of methyl iodide. The resulting reaction mixture was refluxed with stirring for one hour and cooled. The separated solid was collected, recrystallized from water (about 60 ml.), washed successively with ethanol and ether, and dried in vacuo to yield 13.3 g. of ethyl 1-ethyl-1,4-dihydro - 4 - oxo-7-(4-pyridyl)-3-quinolinecarboxylate methiodide, M.P. 270–272° C. with decomposition, alternatively named as 4-(3-carbethoxy-1-ethyl-1,4-dihydro - 4 - oxo - 7 - quinolyl)-1-methylpyridinium iodide.

Following the procedure described in Example 19 but using in place of methyl iodide the corresponding molar equivalent quantity each of ethyl iodide, allyl bromide or benzyl chloride, there is obtained the corresponding 4-(3 - carbethoxy - 1 - ethyl-1,4-dihydro-4-oxo-7-quinolyl)-1-ethylpyridinium iodide, -1-allylpyridinium bromide or -1-benzylpyridinium chloride.

EXAMPLE 20A

Ethyl 1 - ethyl-1,4-dihydro-7-(1-methyl-4-piperidyl)-4-oxo-3-quinolinecarboxylate.—A mixture containing 4.64 g. of ethyl 1-ethyl-1,4-dihydro-4-oxo-7-(4-pyridyl)-3- quinolinecarboxylate methiodide, 200 mg. of platinum oxide and 90 ml. of dimethylformamide was treated under catalytic hydrogenation conditions at 70° C. for five hours using an initial hydrogen pressure of 620 p.s.i. The reaction mixture was filtered to remove the catalyst and the filtrate concentrated in vacuo to remove the solvent. The residue was taken up in about 50 ml. of water and the aqueous solution was made basic with ammonium hydroxide. The separated oil was extracted with methylene dichloride. The extract was dried over anhydrous magnesium sulfate and the methylene dichloride was allowed to evaporate. The remaining oil which crystallized on scratching with a glass rod was recrystallized once from ethyl acetate and once from acetonitrile to yield 1.0 g. of ethyl 1-ethyl - 1,4 - dihydro - 7 - (1-methyl-4-piperidyl)-4-oxo-3-quinolinecarboxylate, M.P. 179–181° C.

The above preparation was repeated using 12.9 g. of ethyl 1 - ethyl - 1,4 - dihydro-4-oxo-7-(4-pyridyl)-3-quinolinecarboxylate methiodide, 500 mg. of platinum oxide and 300 ml. of dimethylformamide to yield 3.2 g. of ethyl 1 - ethyl - 1 - 1,4-dihydro-7-(1-methyl-4-pyridyl)-4-oxo-3-quinolinecarboxylate, M.P. 181–183° C.

EXAMPLE 20B

1 - ethyl - 1,4 - dihydro-7-(1-methyl-4-piperidyl)-4-oxo-3-quinolinecarboxylic acid.—A mixture containing 4.2 g. of ethyl 1-ethyl-1,4-dihydro-7-(1-methyl-4-piperidyl)-4-oxo-3-quinolinecarboxylate and 50 ml. of 6 N hydrochloric acid was refluxed for one hour and then allowed to stand overnight at room temperature. The reaction mixture was concentrated in vacuo and the remaining solid was triturated with isopropyl alcohol, collected and then recrystallized from 95% ethanol to yield 2.7 g. of 1-ethyl-1,4 - dihydro - 7 - (1-methyl-4-piperidyl)-4-oxo-3-quinolinecarboxylic acid, as itst hydrochloride, M.P. 290–292° C. with decomposition.

EXAMPLE 21

1 - ethyl - 1,4 - dihydro-4-oxo-7-(4-piperidyl)-3-quinolinecarboxylic acid.—A mixture containing 16.1 g. of ethyl 1 - ethyl - 1,4 - dihydro-4-oxo-7-(4-pyridyl)-3-quinolinecarboxylate, 125 ml. of absolute ethanol, 3 ml. of acetic acid and 150 mg. of platinum oxide was treated under catalytic hydrogenation conditions at 65° C. for five hours using an initial pressure of 500 p.s.i. The reaction mixture was filtered to remove the catalyst; the filtrate was concentrated to a volume of 50 ml. and to it was added a mixture containing 20 ml. of concentrated hydrochloric acid and 75 ml. of water whereupon a solid separated. The mixture was refluxed with stirring for three hours and the reaction mixture chilled. The solid that separated was filtered off and the filtrate was concentrated to remove the solvent. The remaining gummy material was boiled with isopropyl alcohol to yield a solid which was recrystallized from methanol to yield 5.2 g. of 1-ethyl - 1,4 - dihydro-4-oxo-7-(4-piperidyl)-3-quinolinecarboxylic acid, M.P. 303–306° C.

EXAMPLE 22A

Ethyl 1,4 - dihydro - 1 - (2-hydroxyethyl)-4-oxo-7-(4-pyridyl)-3-quinolinecarboxylate.—To a warm solution containing 26.2 g. of ethyl 1,4-dihydro-4-oxo-7-(4-pyridyl)-1-(2-vinyloxyethyl - 3 - quinolinecarboxylate in 50 ml. of acetic acid was added 5 ml. of water and the reaction solution was heated on a steam bath for one hour. The reaction solution was concentrated in vacuo to remove the liquids; the remaining solid was suspended in water and the solid was collected. The solid was recrystallized from dimethylformamide and dried to yield 18.0 g. of ethyl 1,4-dihydro-1-(2-hydroxyethyl)-4-oxo-7-(4-pyridyl)-3-quinolinecarboxylate, M.P. 154–156° C.

The above intermediate ethyl 1,4-dihydro-4-oxo-7-(4-pyridyl) - 1 - (2-vinyloxyethyl)-3-quinolinecarboxylate was prepared as described in Example 22B.

EXAMPLE 22B

Ethyl 1,4 - dihydro - 4 - oxo-7-(4-pyridyl)-1-(2-vinyloxyethyl)-3-quinolinecarboxylate.—A mixture containing 37 g. of ethyl 1,4-dihydro-4-oxo-7-(4-pyridyl)-3-quinolinecarboxylate, 28.0 g. of anhydrous potassium carbonate and 250 ml. of dimethylformamide was stirred on a steam bath for one hour. To the stirred mixture was added 13.8 g. of 2-vinyloxyethyl chloride and the resulting reaction mixture was heated on a steam bath with stirring for three and one-half hours and filtered while hot. The filtrate was chilled and the solid that separated was collected, recrystallized twice from dimethylformamide, washed with ethanol, and dried in vacuo at 80° C. to yield 26.2 g. of ethyl 1,4 - dihydro-4-oxo-7-(4-pyridyl)-1-(2-vinyloxyethyl)-3-quinolinecarboxylate, M.P. 190–192° C.

EXAMPLE 23

1,4-dihydro - 1 - (2-hydroxyethyl)-4-oxo-7-(4-pyridyl)-3-quinolinecarboxylic acid.—A mixture containing 4.2 g. of ethyl 1,4-dihydro-1-(2-hydroxyethyl)-4-oxo-7-(4-pyridyl)-3-quinolinecarboxylate, 15 ml. of 10% aqueous potassium hydroxide solution and 15 ml. of water was heated on a steam bath for two hours and filtered. To the filtrate was added sufficient hydrochloric acid to produce a pH of about 6.2; the mixture was digested on the steam bath and the solid was collected; and, the solid was washed successively with water, ethanol, dried, recrystallized from a small volume of dimethylformamide and dried to yield 2.63 g. of 1,4-dihydro-1-(2-hydroxyethyl)-4-oxo-7-(4-pyridyl)-3-quinolinecarboxylic acid, M.P. 285–287° C.

EXAMPLE 24

Ethyl 1 - (2-chloroethyl)-1,4-dihydro-4-oxo-7-(4-pyridyl)-3-quinolinecarboxylate.—To a rapidly stirred suspension of 15.0 g. of ethyl 1,4-dihydro-1(2-hydroxyethyl)-4-oxo-7-(4-pyridyl)-3-quinolinecarboxylate in 800 ml. of chloroform was added 17 ml. of thionyl chloride. The mixture was refluxed for five hours with stirring; during this period an initially formed tar disappeared and a solid separated. This solid was collected, washed with chloroform, and dried to obtain 17.0 g. of ethyl 1-(2-chloroethyl) - 1,4 - dihydro - 4 - oxo-7-(4-pyridyl)-3-quinolinecarboxylate as its hydrochloride salt. This was suspended in water and the resulting gel-like mixture was approximately neutralized using 10 KOH. The mixture was heated on the steam bath while adjusting the pH to about 7 to 7.5 and then filtered while hot. The (damp) filter cake was recrystallized twice from ethanol to give, after drying, 11.4 g. of ethyl 1-(2-chloroethyl)-1,4-dihydro-4-oxo-7-(4-pyridyl)-3-quinolinecarboxylate as a cream solid of uncertain melting point.

EXAMPLE 25

1 - (2 - chloroethyl) - 1,4 - dihydro - 4 - oxo - 7 - (4-pyridyl) - 3 - quinolinecarboxylic acid.—A mixture containing 11.2 g. of ethyl 1-(2-chloroethyl)-1,4-dihydro-4-oxo-7-(4-pyridyl)-3-quinolinecarboxylate, 200 ml. of water and 100 ml. of 6 N hydrochloric acid was heated on a steam bath for ninety minutes. The solid which was collected by filtering the hot reaction mixture was washed well first with water and then with ethanol, and dried in vacuo at 70° C. to yield 11.1 g. of 1-(2-chloroethyl)-1,4-dihydro - 4-oxo-7-(4-pyridyl)-3-quinolinecarboxylic acid, as its hydrochloride, M.P. >300° C.

EXAMPLE 26A

Ethyl 7 - (2 - chloro - 6 - methyl - 4 - pyridyl)-1-ethyl-1,4 - dihydro - 4-oxo-3-quinolinecarboxylate is prepared following the procedure described in Example 2 using a corresponding molar equivalent quantity of ethyl 7-(2-chloro - 6 - methyl - 4 - pyridyl) - 1,4 - dihydro-4-oxo-3-quinolinecarboxylate in place of ethyl 1,4-dihydro-4-oxo-7-(4-pyridyl)-3-quinolinecarboxylate.

The above intermediate ethyl 7-(2-chloro-6-methyl-4-pyridyl) - 1,4 - dihydro - 4 - oxo-3-quinolinecarboxylate was prepared in six steps starting with 3-nitrobenzoylacetonitrile according to the procedure in Examples 26B through 26F.

EXAMPLE 26B

2 - hydroxy - 6 - methyl - 4 - (3 - nitrophenyl)pyridine).—To a mixture containing 76.0 g. of 3-nitrobenzoylacetonitrile and 125 ml. of acetone was added about 50 g. of polyphosphoric acid and the mixture was swirled until thoroughly mixed. Then an additional 1200 g. of polyphosphoric acid was added and the resulting reaction mixture was heated with stirring at about 70° C. for about ten minutes and then heated on a steam bath for one hour. To the hot reaction mixture was cautiously added dropwise another 35 ml. of acetone and the reaction mixture was heated with stirring allowing the reaction temperature to rise slowly to about 140° C. over a twenty minute period. The reaction mixture was cooled to about 90° C. and carefully added with stirring to seven liters of a mixture of ice and water. The resulting mixture was stirred until the excess polyphosphoric acid hydrolyzed and the precipitated solid was collected by filtering the mixture through two large sintered glass funnels. The combined solid was refluxed with enough dimethylformamide to yield a total volume of about 2200 ml. to dissolve all of the solid and the resulting solution was heated for about one hour, thereby concentrating the volume of the solution to about 100 ml. The resulting solution was cooled and then chilled in an ice box. The solid that separated was slurried with warm water, and the water filtered off and discarded. The solid was again slurried with warm water, the mixture filtered and the solid dried in vacuo over phosphorus pentoxide at 25° C. to yield 34 g. of 2-hydroxy-6-methyl-4-(3-nitrophenyl)pyridine), M.P. 285.5–288° C.

EXAMPLE 26C

4 - (3 - aminophenyl) - 2 - hydroxy - 6 - methylpyridine.—A mixture containing 28.75 g. of 2-hydroxy-6-methyl-4-(3-nitrophenyl)pyridine), 300 ml. of dimethylformamide and 2.25 g. of 10% palladium-on-charcoal catalyst was treated under catalytic hydrogenation conditions using an initial hydrogen pressure of 40 p.s.i. After completion of the reduction, the reaction mixture was filtered to remove the catalyst which was washed successively with dimethylformamide and then methanol. The combined filtrate and washings were concentrated in vacuo to remove the solvents. The residue was dissolved in 100 ml. of hot methanol, the hot solution filtered, the filtrate concentrated to a volume of about 100 ml. and cooled. The resulting solid precipitate was collected, washed with a little methanol and air-dried to yield 17.0 g. of 4 - (3 - aminophenyl)-2-hydroxy-6-methylpyridine, M.P. 229.5–231° C.

EXAMPLE 26D

Diethyl 3 - (2 - hydroxy - 6-methyl-4-pyridyl)-anilinomethylenemalonate.—A mixture containing 20.0 g. of 4-(3 - aminophenyl) - 2 - hydroxy - 6 - methylpyridine and 21.75 g. of diethyl ethoxymethylenemalonate was thoroughly mixed and then heated at about 120–130° C. for about one hour until all of the ethanol formed by the reaction had evolved. The reaction mixture was cooled and the remaining residue was dissolved in 325 ml. of hot acetonitrile. The hot solution was concentrated to a volume of about 110 ml., cooled and stored in an ice box. The resulting crystalline precipitate was collected, washed with a small quantity of ether and air-dried to yield 33.2 g. of diethyl 3-(2-hydroxy-6-methyl-4-pyridyl) anilinomethylenemalonate, M.P. 171–173.5° C.

EXAMPLE 26E

Ethyl 1,4 - dihydro - 7 - (2 - hydroxy - 6 - methyl-4-pyridyl) - 4 - oxo - 3 - quinolinecarboxylate, 21.6 g., was prepared following the procedure described in Example 1D using 25 g. of diehtyl 3-(2-hydroxy-6-methyl-4-pyridyl)anilinomethylenemalonate and 200 ml. of Dowtherm A.

EXAMPLE 26F

Ethyl 7 - (2 - chloro - 6 - methyl - 4 - pyridyl) - 1,4-dihydro - 4 - oxo - 3 - quinolinecarboxylate.—A mixture containing 1.62 g. of ethyl 1,4-dihydro-7-(2-hydroxy-6-methyl - 4 - pyridyl) - 4 - oxo-3-quinolinecarboxylate, 20 ml. of phosphorus oxychloride and 1 ml. of dimethylformamide was warmed on a steam bath for one hour and then heated in vacuo to remove the excess phosphorus oxychloride and solvent. The residue was dissolved in 200 ml. of chloroform. The chloroform solution was washed successively with 100 ml. of ice water and 100 ml. of 10% aqueous sodium bicarbonate solution, and then heated in vacuo to remove the chloroform. The solid residue was dissolved in 125 ml. of hot acetonitrile and the hot solution filtered. The filtrate was concentrated to a volume of 30 ml. by heating on a hot plate and chilled. The precipitated solid was collected, washed with a minimum of acetonitrile and air-dried to yield 1.12 g. of ethyl 7 - (2 - chloro - 6 - methyl - 4 - pyridyl)-1,4-dihydro-4-oxo-3-quinolinecarboxylate, M.P. 172.5–175° C.

EXAMPLE 27

7 - (2 - chloro - 6 - methyl - 4 - pyridyl)-1-ethyl-1,4-dihydro - 4 - oxo - 3 - quinolinecarboxylic acid.—A mixture of 1 g. of ethyl 7-(2-chloro-6-methyl-4-pyridyl)-1,4-dihydro - 4 - oxo-3-quinolinecarboxylate and an excess (about four-fold) of 0.5% aqueous sodium hydroxide solution is heated on a steam bath for about fifteen minutes. The resulting solution is allowed to cool to about 70° C. and then partially neutralized (to a pH of about 9) with acetic acid. The warm solution is treated with decolorizing charcoal and filtered. The filtrate is warmed to about 55° C. and acetic acid is added dropwise with stirring until the pH of 6 is attained, allowing the temperature of the solution to gradually increase to about 65–70° C. The mixture is allowed to cool. The crystalline precipitate is collected and dried to yield the product, 7-(2-chloro - 6 - methyl - 4 - pyridyl) - 1 - ethyl - 1,4-dihydro-4-oxo-3-quinolinecarboxylic acid.

EXAMPLE 28

7 - (2 - aminomethyl - 4 - pyridyl) - 1 - ethyl - 1,4-dihydro - 4 - oxo - 3 - quinolinecarboxylic acid in the form of its hydrochloride salt was obtained by refluxing 1.89 g. of ethyl 7-(2-acetylaminomethyl-4-pyridyl)-1-ethyl-1, 4 - dihydro - 4 - oxo - 3 - quinolinecarboxylate with 60 ml. of 3 N aqueous hydrochloric acid for twenty-four hours, filtering the reaction mixture and evaporating the filtrate in vacuo to remove the excess hydrochloric acid together with the ethanol and acetic acid each formed by the reaction. The product was recrystallized by dissolving it in a minimum amount of hot water and adding hot ethanol to the hot solution; obtained was 800 mg., M.P. 241–244° C.

EXAMPLE 29

Ethyl 7-(2-carbamyl-4-pyridyl)-1-ethyl - 1,4 - dihydro-4-oxo-3-quinolinecarboxylate. — A mixture containing 1.0 g. of ethyl 7-(2-cyano-4-pyridyl)-1-ethyl-1,4-dihydro-4-oxo-3-quinolinecarboxylate and 10 ml. of polyphosphoric acid was heated for two and one-half hours at 95–100° C. The reaction solution was cooled to about 50° C. and poured into 40 ml. of cold water with stirring. The precipitated solid was collected, washed successively with dilute aqueous sodium bicarbonate solution and water, air-dried, recrystallized from dimethylformamide, washed successively with acetonitrile and ether, and dried to yield 610 mg. of ethyl 7-(2-carbamyl-4-pyridyl)-1-ethyl-1,4-dihydro - 4 - oxo - 3 - quinolinecarboxylate, M.P. 244–245° C.

EXAMPLE 30

7 - (2 - amino - 4 - pyridyl) - 1 - ethyl - 1,4 - dihydro-4-oxo-3-quinolinecarboxylic acid.—To 0.05 mole of ethyl 7-(2-carbamyl-4-pyridyl)-1-ethyl-1,4 - dihydro - 4 - oxo-3-quinolinecarboxylate in 200 ml. of dimethylformamide is added 0.05 mole of lead tetraacetate followed by 15 ml. of triethylamine whereupon an exothermic reaction ensues. The reaction mixture is allowed to stand for about thirty minutes; the solvents are distilled off in vacuo; and the residue is treated with cold 3 N hydrochloric acid. The precipitated lead dichloride is filtered off. The filtrate is boiled for one hour and then concentrated in vacuo to remove the hydrochloric acid and to yield 7-(2-amino-4-pyridyl)-1-ethyl-1,4-dihydro-4-oxo - 3 - quinolinecarboxylic acid in the form of its hydrochloride salt.

EXAMPLE 31

Ethyl 7-(2-acetoxy-4-pyridyl)-1-ethyl - 1,4 - dihydro-4-oxo-3-quinolinecarboxylate.—A mixture containing 0.9 g. of ethyl 1-ethyl-1,4-dihydro-7-(1-oxido - 4 - pyridyl)-4-oxo-3-quinolinecarboxylate and 10 ml. of acetic anhydride was refluxed for two hours and the solvents removed in vacuo. To the residue was added 3 ml. of ethanol and the ethanol was distilled off in vacuo. The remaining solid was dissolved in 10 ml. of hot isopropyl acetate and the solution chilled. The separated solid was collected and dried to yield about 200 mg. of ethyl 7-(2-acetoxy-4-pyridyl)-1-ethyl-1,4-dihydro-4-oxo - 3 - quinolinecarboxylate.

EXAMPLE 32

1-ethyl-1,4-dihydro-7-(2-hydroxy-4 - pyridyl) - 4 - oxo-3-quinolinecarboxylic acid.—A mixture containing 13.3 g. of ethyl 1-ethyl-1,4-dihydro-7-(1-oxido-4-pyridyl)-4-oxo-3-quinolinecarboxylate in 100 ml. of acetic anhydride was refluxed with stirring for one hour. The reaction mixture was concentrated in vacuo and the oily product was treated with 25 ml. of ethanol. The resulting solution was heated in vacuo to remove the ethanol and to leave ethyl 7-(2-acetoxy-4-pyridyl)-1-ethyl-1,4-dihydro - 4 - oxo - 3-quinolinecarboxylate which was refluxed for three hours with excess dilute aqueous hydrochloric acid. The separated solid was collected, washed successively with water and ethanol, and recrystallized twice from dimethylformamide using decolorizing charcoal and twice from acetic acid using decolorizing charcoal to yield 4.6 g. of 1-ethyl-1,4-dihydro-7-(2-hydroxy-4-pyridyl)-4-oxo-3 - quinolinecarboxylic acid, M.P. 304–306° C. with decomposition. The melting point of this product was raised to 308–309° C. with decomposition by further purification as follows. A sample was taken up in dilute aqueous sodium hydroxide solution; the solution was treated with decolorizing charcoal and filtered; and, the filtrate was acidified with dilute hydrochloric acid. The precipitated solid was collected, washed well with distilled water and the wet solid was azeotroped with xylene to remove the water. The solid was collected, washed successively with acetonitrile and ether, dried in vacuo at 100° C. and recrystallized from dimethylformamide.

EXAMPLE 33

Methyl 1-ethyl-1,4-dihydro-7-(2-methoxy-4 - pyridyl)-4-oxo-3-quinolinecarboxylate.—To 10 g. of 1-ethyl-1,4-dihydro-7-(2-hydroxy-4-pyridyl)-4 - oxo - 3 - quinolinecarboxylic acid suspended in 200 ml. of chloroform is added excess diazomethane dissolved in ether. The suspension is stirred for twenty-four hours; the resulting nearly clear solution is filtered; and, the filtrate is evaporated to remove the solvents and to yield the product, methyl 1-ethyl-1,4-dihydro-7-(2 - methoxy - 4 - pyridyl)-4-oxo-3-quinolinecarboxylate.

EXAMPLE 34

Ethyl 1-ethyl-1,4-dihydro - 4 - oxo- 7 - (4 - pyridyl)-3-quinolinecarboxylate.—A mixture containing 50 g. of ethyl 1,4-dihydro-4-oxo - 7 - (4 - pyridyl) - 3 - quinolinecarboxylate, 900 ml. of dimethylformamide and 60 g. of anhydrous potassium carbonate was stirred on a steam bath for thirty minutes. To this stirred solution heated on a steam bath was added dropwise over a period of 60 to 90 minutes a solution containing 51 g. of ethyl tosylate in 150 ml. of dimethylformamide. The reaction mixture was heated with stirring for another two hours and then filtered. The filtrate was heated in vacuo to remove the dimethylformamide and the residue was taken up in chloroform. The chloroform solution was washed with water and then evaporated in vacuo to remove the chloroform. The residue was crystallized from isopropyl alcohol to yield 33.4 g. of ethyl 1-ethyl-1,4-dihydro-4-oxo-7-(4-pyridyl)-3-quinolinecarboxylate, M.P. 169–172° C.

EXAMPLE 35

Sodium 1-ethyl-1,4-dihydro-4-oxo-7-(4 - pyridyl) - 3-quinolinecarboxylate.—To a mixture containing 15.02 g. of 1-ethyl-1,4-dihydro-4-oxo-7-(4-pyridyl) - 3 - quinolinecarboxylic acid and 300 ml. of methanol was added a solution of 2.75 g. of sodium methoxide in 50 ml. of methanol. The mixture was filtered and the filtrate treated with about 2 ml. of water and cooled. The crystalline precipitate was collected, washed with absolute methanol and dried at 70° C. to yield 9.5 g. of sodium 1-ethyl-1,4-dihydro-4-oxo-7-(4 - pyridyl) - 3 - quinolinecarboxylate, M.P. 260–261° C.

EXAMPLE 36

1-ethyl-1,4-dihydro-4-oxo-7-(4-pyridyl) - 3 - quinolinecarboxylic acid methanesulfonate.—To 2.94 g. of 1-ethyl-1,4-dihydro-4-oxo-7-(4-pyridyl) - 3 - quinolinecarboxylic acid in 50 ml. of methanol was added 6.96 g. of methanesulfonic acid; the resulting mixture was heated to reflux and then treated with 50 ml. of water to achieve a solution. The hot solution was treated with decolorizing charcoal and filtered. The filtrate was allowed to cool to room temperature and the precipitated crystalline salt was collected, washed well with absolute ethanol and dried to yield 1-ethyl-1,4-dihydro-4-oxo-7-(4-pyridyl) - 3 - quinolinecarboxylic acid methanesulfonate.

EXAMPLE 37

Ethyl 7-(2-chloro-4-pyridyl)-1-ethyl - 1,4 - dihydro - 4-oxo-3-quinolinecarboxylate.—A mixture containing 600 mg. of ethyl 1-ethyl-1,4-dihydro-7-(2-hydroxy-4-pyridyl)-4-oxo-3-quinolinecarboxylate and 5.0 ml. of phosphorus oxychloride is refluxed with stirring for about eight hours; most of the excess phosphorus oxychloride is distilled off in vacuo; and, to the residue is added crushed ice. To the cold mixture is added gradually ammonium hydroxide solution until the mixture is basic. The cold mixture is allowed to stand for about ninety minutes; the pH is adjusted to about 8; and, the solid is collected. The solid is dissolved in chloroform. The chloroform layer is separated from a small amount of aqueous layer, dried over anhydrous potassium carbonate and concentrated in vacuo to remove the chloroform. The residue is crystallized from acetonitrile using decolorizing charcoal and dried in vacuo at 40° C. to yield ethyl 7-(2-chloro-4-pyridyl)-1-ethyl-1,4 - dihydro - 4 - oxo - 3 - quinolinecarboxylate.

EXAMPLE 38

1-ethyl-7-(2-formyl - 6 - methyl - 4 - pyridyl) - 1,4-dihydro - 4 - oxo - 3 - quinolinecarboxylic acid.—A mixture containing 5 g. of 1-ethyl-1,4-dihydro-7-(2-hydroxymethyl - 6 - methyl - 4 - pyridyl)-4-oxo-3-quinolinecarboxylic acid, 200 ml. of chloroform and 15 g. of activated manganese dioxide is refluxed with stirring having a continuous water separator attached to the reaction vessel. The reaction mixture is refluxed for about six hours after which time the theoretical quantity of water is collected. The reaction mixture is then filtered while hot and the filter cake is washed with hot chloroform. The combined filtrate and washings are treated with decolorizing charcoal, the mixture filtered, and the filtrate evaporated in vacuo to yield the product, 1-ethyl-7-(2-formly - 6 - methyl - 4 - pyridyl)-1,4-dihydro - 4 - oxo-3-quinolinecarboxylic acid.

EXAMPLE 39

1-ethyl - 7 - (2,6 - diethyl - 4 - pyridyl) - 1,4 - dihydro-4-oxo - 3 - quinolinecarboxylic acid is prepared following the procedure described in Example 6A using a corresponding molar equivalent quantity of ethyl 7-(2,6-diethyl - 4 - pyridyl) - 1,4 - dihydro - 4 - oxo-3-quinolinecarboxylate in place of ethyl 1,4-dihydro - 7 - (2,6-dimethyl - 4 - pyridyl) - 4 - oxo - 3 - quinolinecarboxylate. The intermediate ethyl 7-(2,6-diethyl-4-pyridyl) - 1,4 - dihydro - 4 - oxo - 3 - quinolinecarboxylate is prepared following the procedures described in Examples 6B and 6C starting with a molar equivalent quantity of 4-(3-aminophenyl) - 2,6 - diethylpyridine in place of 4-(3-aminophenyl)-2,6-dimethylpyridine.

EXAMPLE 40

Ethyl 1-ethyl - 1,4 - dihydro - 7 - (2-methyl-1-oxido-4-pyridyl) - 4 - oxo - 3 - quinolinecarboxylate is prepared following the procedure described in Example 13 using a molar equivalent quantity of ethyl 1-ethyl-1,4-dihydro-7-(2-methyl - 4 - pyridyl) - 4 - oxo - 3 - quinolinecarboxylate in place of the corresponding 7-(2,6-dimethyl-4-pyridyl) compound.

EXAMPLE 41

1-ethyl - 1,4 - dihydro - 7 - (2-hydroxymethyl - 4-pyridyl) - 4 - oxo - 3 - quinolinecarboxylic acid is prepared following the procedure described in Example 15 using a corresponding molar equivalent quantity of ethyl 1,4-dihydro - 7 - (2-methyl - 1 - oxido - 4 - pyridyl)-4-oxo-3-quinolinecarboxylate in place of the corresponding 7-(2,6-dimethyl - 1 - oxido - 4 - pyridyl) compound. The corresponding ethyl 7-(2-acetoxymethyl - 4 - pyridyl)-1-ethyl - 1,4 - dihydro - 4 - oxo - 3 - quinolinecarboxylate is first obtained as in Example 15 and this 7-(2-acetoxymethyl-4-pyridyl) compound is then hydrolyzed by refluxing using 3 N hydrochloric acid as in Example 15 to yield the said 7-(2-hydroxymethyl-4-pyridyl) compound.

EXAMPLE 42

1-ethyl - 1,4 - dihydro - 7 - (2 - methoxy - 4 - pyridyl)-4-oxo - 3 - quinolinecarboxylic acid, in the form of its hydrochloride, is prepared by hydrolyzing methyl 1-ethyl-1,4-dihydro - 7 - (2 - methoxy - 4 - pyridyl) - 4 - oxo-3-quinolinecarboxylate with aqueous hydrochloric acid according to the procedure described in Example 8B.

EXAMPLE 43

7-(2-chloro - 4 - pyridyl) - 1 - ethyl - 1,4 - dihydro-4-oxo - 3 - quinolinecarboxylic acid, in the form of its hydrochloride, is obtained by hydrolyzing ethyl 7-(2-chloro - 4 - pyridyl) - 1 - ethyl - 1,4 - dihydro-4-oxo-3-quinolinecarboxylate with aqueous hydrochloric acid according to the procedure described in Example 8B.

The actual determination of the numerical antibacterial data definitive for a particular compound of the invention is readily obtained by known standard test procedures by technicians versed in antibacterial test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

We claim:

1. A compound selected from: 1-$R_1$ - 1,4 - dihydro-3-(COOR) - 4 - oxo - 7 - PY - quinoline where $R_1$ is non-tertiary lower-alkyl, lower-hydroxyalkyl or lower-haloalkyl, R is hydrogen or non-tertiary lower-alkyl, and PY is Q-1-(O)$_n$-4(3 or 2)-pyridyl or Q-1-Q'-4(3 or 2)-piperidyl where $n$ is zero or 1, Q is from zero to four substituents selected from non-tertiary lower-alkyl where two of four said substituents at the 3- and 5- positions of 4-pyridyl can be replaced by lower-carbalkoxy or carboxy, or Q is from one to two substituents selected from lower-alkoxy, halo, hydroxy, lower-alkanoyloxy, hydroxymethyl, formyl, carboxy and lower-carbalkoxy where one of the two said substituents can be replaced by non-tertiary lower-alkyl, or Q is a single substituent selected from aminomethyl, lower-alkanoylaminomethyl, amino, cyano and carbamyl, and Q' is hydrogen or non-tertiary lower-alkyl, where lower in each of lower-alkyl, lower-alkoxy, lower-alkanoyl and alkoxy of lower-carbalkoxy designates from one to six carbon atoms and in each of lower-hydroxyalkyl and lower-haloalkyl designates from two to six carbon atoms; and, a medicinally acceptable salt thereof.

2. A compound selected from: a compound of the formula

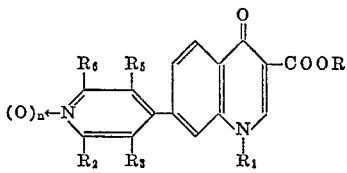

where R is hydrogen or non-tertiary lower-alkyl, $R_1$ is non-tertiary lower-alkyl, lower-hydroxyalkyl or lower-haloalkyl, $n$ is zero or 1, and, $R_2$, $R_3$, $R_5$ and $R_6$ are each hydrogen, or from one to four substituents selected from non-tertiary lower-alkyl where $R_3$ and $R_5$ each can be lower-carbalkoxy or carboxy where $R_2$ and $R_6$ are each said lower-alkyl, or two or $R_2$, $R_3$, $R_5$ and $R_6$ are each hydrogen and at least one or both of the other two are substituents selected from lower-alkoxy, halo, hydroxy, lower-alkanoyloxy, hydroxymethyl, formyl, carboxy and lower-carbalkoxy where the second of two said substituents can be replaced by non-tertiary lower-alkyl, or three of $R_2$, $R_3$, $R_5$ and $R_6$ are each hydrogen and the other is a substituent selected from aminomethyl, lower-alkanoylaminomethyl, amino, cyano and carbamyl, where lower has the same designations given in claim 1; and, a medicinally acceptable salt thereof.

3. A compound according to claim 2 where R is hydrogen, $n$ is zero, and $R_2$, $R_3$, $R_5$ and $R_6$ are each hydrogen.

4. A compound according to claim 2 where R is hydrogen, $n$ is zero, $R_2$ and $R_6$ are each lower-alkyl, and, $R_3$ and $R_5$ are each hydrogen.

5. A compound according to claim 2 where R is hydrogen, $n$ is zero, $R_2$ is lower-alkyl, and $R_3$, $R_5$ and $R_6$ are each hydrogen.

6. A compound according to claim 2 where R is hydrogen, $n$ is zero, $R_2$ is carboxy, and, $R_3$, $R_5$ and $R_6$ are each hydrogen.

7. A compound according to claim 2 wherein R is hydrogen, $n$ is zero, $R_2$ is hydroxymethyl, $R_6$ is lower-alkyl, and, $R_3$ and $R_5$ are each hydrogen.

8. 1 - ethyl-1,4-dihydro-4-oxo-7-(4-pyridyl)-3-quinolinecarboxylic acid according to claim 3 or a medicinally acceptable salt thereof.

9. 1 - ethyl - 1,4 - dihydro-7-(2,6-dimethyl-4-pyridyl)-4-oxo-3-quinolinecarboxylic acid according to claim 4 or a medicinally acceptable salt thereof.

10. 1 - ethyl - 1,4 - dihydro-7-(2-methyl-4-pyridyl)-4-oxo-3-quinolinecarboxylic acid according to claim 5 or a medicinally acceptable salt thereof.

11. 7 - (2 - carboxy - 4 - pyridyl)-1-ethyl-1,4-dihydro-4-oxo - 3 - quinolinecarboxylic acid according to claim 6 or a medicinally acceptable salt thereof.

12. 1 - ethyl - 1,4 - dihydro - 7 - (2-hydroxymethyl-6-methyl - 4 - pyridyl)-4-oxo-3-quinolinecarboxylic acid according to claim 7 or a medicinally acceptable salt thereof.

13. A compound according to claim 1 where R is hydrogen and PY is 1-(lower-alkyl)-4-piperidyl.

14. 1 - ethyl - 1,4 - dihydro - 7 - (1-methyl-4-piperidyl)-4-oxo-3-quinolinecarboxylic acid according to claim 13 or a medicinally acceptable salt thereof.

15. 1,4 - dihydro - 1 - (2 - hydroxyethyl) - 4 - oxo-7-(4-pyridyl)-3-quinolinecarboxylic acid according to claim 1 or a medicinally acceptable salt thereof.

16. 1 - (2 - chloroethyl) - 1,4-dihydro-4-oxo-7-(4-pyridyl - 3 - quinolinecarboxylic acid according to claim 1 or a medicinally acceptable salt thereof.

17. A compound of the formula

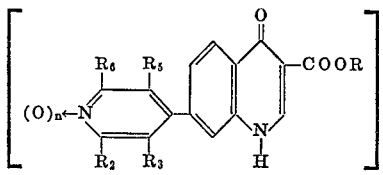

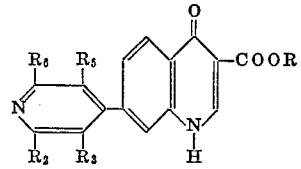

and its corresponding tautomeric 3-COOR-4-hydroxy-7-pyridylquinoline, where R is hydrogen or non-tertiary lower-alkyl, and, $R_2$, $R_3$, $R_5$ and $R_6$ are each hydrogen or from one to four substituents selected from non-tertiary lower-alkyl where $R_3$ and $R_5$ in stead of said lower-alkyl each can be lower carbalkoxy or carboxy where $R_2$ and $R_6$ are each said lower-alkyl, or two of $R_2$, $R_3$, $R_5$ and $R_6$ are each hydrogen and at least one or both of the other two are substituents selected from halo and hydroxy, where the second of said substituents can be replaced by non-tertiary lower-alkyl, where lower in each of lower-alkyl and alkoxy of lower-carbalkoxy designates from one to six carbon atoms.

18. A compound according to claim 17 where $R_2$, $R_3$, $R_5$ and $R_6$ are each hydrogen.

19. A compound according to claim 17 where $R_2$ and $R_6$ are each lower-alkyl, and $R_3$ and $R_5$ are each hydrogen.

20. A compound according to claim 17 where $R_2$ is lower-alkyl and $R_3$, $R_5$ and $R_6$ are each hydrogen.

21. Ethyl 1 - ethyl - 1,4 - dihydro-4-oxo-7-(4-pyridyl)-3-quinolinecarboxylate according to claim 2 or a medicinally acceptable salt thereof.

22. Eethyl 1 - ethyl - 1,4-dihydro-7-(2,6-dimethyl-4-pyridyl)-4-oxo-3-quinolinecarboxylate according to claim 2 or a medicinally acceptable salt thereof.

23. 1 - ethyl - 1,4 - dihydro - 4 - oxo - 7-(3-pyridyl)-3-quinolinecarboxylic acid according to claim 1 or a medicinally acceptable salt thereof.

24. 7 - (2 - chloro - 4 - pyridyl) - 1 - ethyl-1,4-dihydro-4 - oxo - 3 - quinolinecarboxylic acid according to claim 2 or a medicinally acceptable salt thereof.

25. 7 - (2 - chloro - 6 - methyl - 4 - pyridyl)-1-ethyl-1,4-dihydro-4-oxo - 3 - quinolinecarboxylic acid according to claim 2 or a medicinally acceptable salt thereof.

References Cited
UNITED STATES PATENTS

| | | | |
|---|---|---|---|
| 3,287,458 | 11/1966 | Kaminsky | 260—287 |
| 3,324,135 | 6/1967 | Lesher | 260—287 |
| 3,472,859 | 10/1969 | Lesher | 260—287 |
| 3,563,981 | 2/1971 | Lesher | 260—287 |
| 3,496,184 | 2/1970 | Mizzoni | 260—287 R |
| 3,506,667 | 4/1970 | Kaminsky | 260—287 R |

OTHER REFERENCES 1,207,771   10/1970   Great Britain _____ 260—287

DONALD G. DAUS, Primary Examiner

U.S. Cl. X.R.

260—283 CN, 286 Q, 287 R, 293.52, 295 R, 296 R, 297 R, 297; 424—258

UNITED STATES PATENT OFFICE
CERTIFICATE OF CORRECTION

Patent No. 3,753,993  Dated August 21, 1973

Inventor(s) George Y. Lesher and Philip M. Carabateas

It is certified that error appears in the above-identified patent and that said Letters Patent are hereby corrected as shown below:

Column 2, lines 17 and 18, "3-hydrobutyl" should read 3-hydroxybutyl --.

Column 3, lines 34-39, formula IVA,

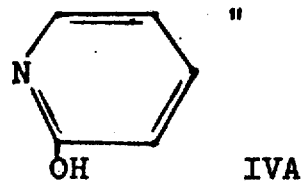

should read

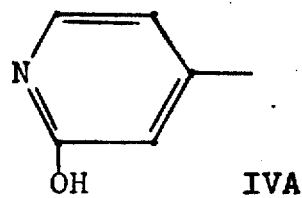

--.

Column 6, line 1, "perbenzoic acids" should read perbenzoic acid --.

Column 6, line 2, "peractice" should read -- peracetic --.

Column 6, line 42, "7-[2-lower-alkoxy)-" should read 7-[2-(lower-alkoxy)- --.

Column 6, line 57, "eruginosa" should read -- aeruginosa --.

Column 25, line 10, "lower-alkyll," should read -- lower-alkyl, --

Column 25, line 16, change "or" (second occurrence) to read -- of

UNITED STATES PATENT OFFICE
CERTIFICATE OF CORRECTION

Patent No. 3,753,993                    Dated August 21, 1973

Inventor(s) George Y. Lesher and Philip M. Carabateas

It is certified that error appears in the above-identified patent and that said Letters Patent are hereby corrected as shown below:

Column 26, lines 2 thru 8, omit formula drawing within brackets [ ] and the brackets.

Column 26, line 21, "in stead" should read -- instead --.

Column 26, line 39, "Eethyl" should read -- Ethyl --.

Signed and sealed this 10th day of September 1974.

(SEAL)
Attest:

McCOY M. GIBSON, JR.
Attesting Officer

C. MARSHALL DANN
Commissioner of Patents